(12) United States Patent
Crocker

(10) Patent No.: US 11,615,590 B2
(45) Date of Patent: Mar. 28, 2023

(54) METHODS AND SYSTEMS FOR GENERATING SURFACES FROM POLYGONAL DATA

(71) Applicant: IntegrityWare, Inc, San Diego, CA (US)

(72) Inventor: Gary Arnold Crocker, San Diego, CA (US)

(73) Assignee: IntegrityWare, Inc., Lake Havasu, AZ (US)

( * ) Notice: Subject to any disclaimer, the term of this patent is extended or adjusted under 35 U.S.C. 154(b) by 0 days.

(21) Appl. No.: 16/422,982

(22) Filed: May 25, 2019

(65) Prior Publication Data

US 2021/0134059 A1    May 6, 2021

(51) Int. Cl.
*G06T 17/20* (2006.01)
*G06T 17/10* (2006.01)

(52) U.S. Cl.
CPC ............ *G06T 17/205* (2013.01); *G06T 17/10* (2013.01)

(58) Field of Classification Search
None
See application file for complete search history.

(56) References Cited

U.S. PATENT DOCUMENTS

| | | | | |
|---|---|---|---|---|
| 5,655,063 A | * | 8/1997 | Crocker | G06T 17/00 345/420 |
| 2002/0191863 A1 | * | 12/2002 | Biermann | G06T 19/20 382/285 |
| 2013/0100130 A1 | * | 4/2013 | Crocker | G06T 15/10 345/420 |
| 2013/0127857 A1 | * | 5/2013 | Carr | G06T 17/20 345/423 |
| 2013/0286012 A1 | * | 10/2013 | Medioni | G06T 17/00 345/420 |

* cited by examiner

*Primary Examiner* — Tize Ma

(57) ABSTRACT

A method of producing surface data from electronic polygonal data is disclosed. The method includes accessing the polygonal data with a computer, the polygonal data defining a mesh of polygonal data points and including a plurality of vertices, and where the polygonal data describes an object. The method also includes generating a plurality of bounded areas, each including one or more vertices of the polygonal data, expanding a plurality of the bounded areas by adding a plurality of vertices thereto, generating a surface for each of the expanded bounded areas based on the vertices of the expanded bounded areas, generating the surface data based at least in part on the surfaces, and storing the surface data in a computer readable data storage.

20 Claims, 27 Drawing Sheets

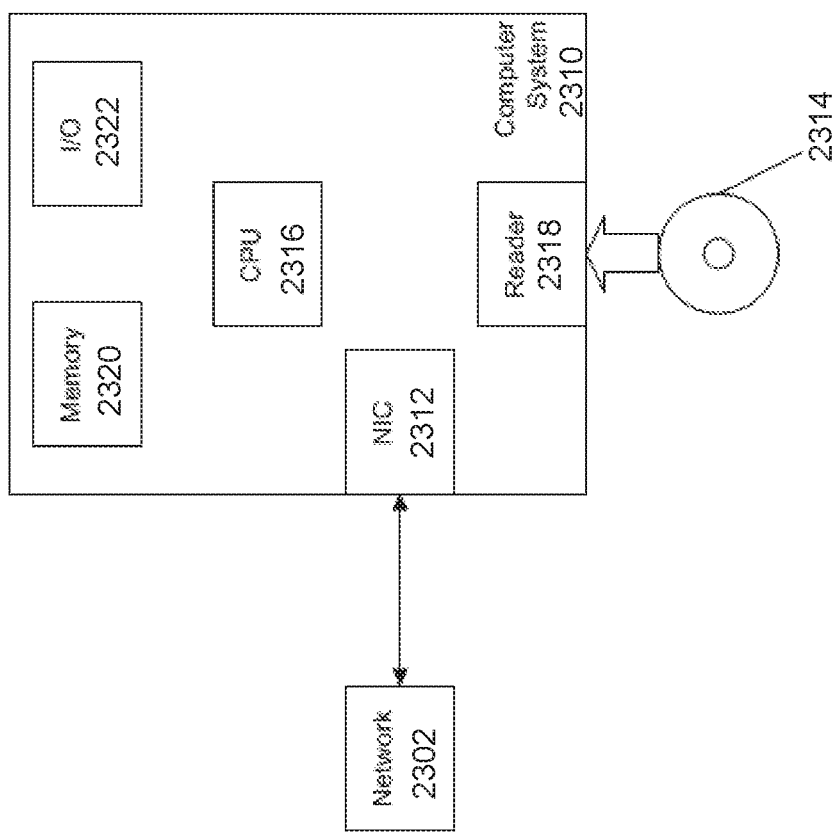

METHODS AND SYSTEMS FOR GENERATING SURFACES FROM POLYGONAL DATA

FIELD OF THE INVENTION

This disclosure relates in general, but not by way of limitation, to generating a surface model of a polygonal data object.

BACKGROUND OF THE INVENTION

Polygonal model data is created with, for example, a 3-D CAD software tool by, for example, a designer. The polygonal model or polygonal mesh includes discrete data points describing one or more surfaces or objects. Polygonal models are convenient for design work at least because they define the surface or object at a degree of detail convenient for the designer to work with. The shape of the surface or object is defined by the data points, and the surface between the data points is perceived, but is not represented in the data. This allows for the CAD system to function quicker because of a significantly reduced data set representing the surface or object, while providing the designer enough detail to manipulate to achieve a desired design.

Once the designer has finished the design, the polygonal data can be used, for example, as the basis for manufacturing a physical object or for generating an image of the designed object. To manufacture the object, or analyze it, or to generate the image, the mesh data is often not sufficient. For a physical object or a realistic image, a BREP object containing one or more surfaces must be defined. The surfaces are preferably Non-uniform rational B-spline (NURBS). NURBS is a mathematical model commonly used to represent curves and surfaces, which are either analytic or freeform. A BREP (Boundary REPresentation) may be understood to be a geometric and topological representation used, for example, in CAD applications that links together curves and surfaces to form either a solid (closed volume) or a shell (open).

BRIEF SUMMARY OF THE INVENTION

One inventive aspect is a method of producing surface data representing a continuous surface based on electronic polygonal data. The method includes accessing the polygonal data with a computer, the polygonal data defining a mesh of polygonal data points and including a plurality of vertices, and the polygonal data describing an object. The method also includes generating a plurality of bounded areas, each including one or more vertices of the polygonal data, expanding a plurality of the bounded areas by adding a plurality of vertices thereto, generating a surface for each of the expanded bounded areas based on the vertices of the expanded bounded areas, generating the surface data based at least in part on the surfaces, and storing the surface data in a computer readable data storage.

Another inventive aspect is a method of producing BREP data from electronic polygonal data. The method includes accessing the polygonal data with a computer, the polygonal data defining a mesh of polygonal data points and including a plurality of vertices, and the polygonal data describing an object. The method also includes generating a plurality of bounded areas, each including a plurality of vertices of the polygonal data, and each bounded area overlapping the bounded areas adjacent thereto. The method also includes generating a surface for each of the bounded areas based on the vertices of the bounded areas, assembling the generated surfaces to generate the surface data, and storing the surface data in a computer readable data storage.

BRIEF DESCRIPTION OF THE DRAWINGS

FIG. 23 shows a configuration for a computer system constructed in accordance with the present disclosure.

DETAILED DESCRIPTION OF THE INVENTION

Figure 1:
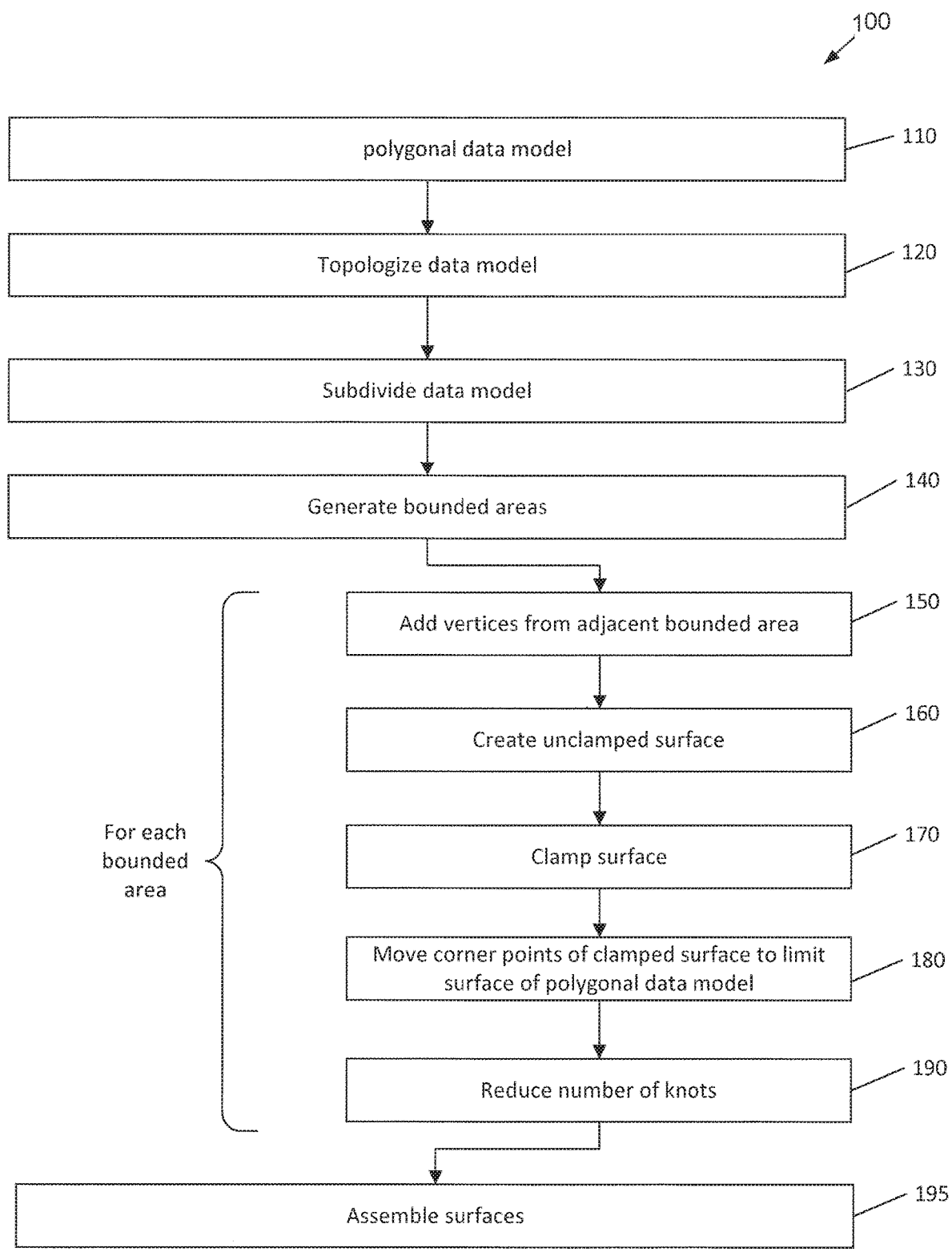
FIG. 1 is a flowchart illustrating a method used to generate a BREP object data from polygonal data.

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Various inventive aspects of certain embodiments of methods and systems for generating BREP object data from polygonal data are discussed. The methods and systems receive polygonal data which describe discrete points on an object. The methods and systems analyze and use the data to calculate and define a BREP which accurately represents the polygonal object. For example, the methods and systems may receive polygonal data, and generate a BREP object. Among other beneficial aspects, the BREP object defined by the methods and systems may be G2 continuous at all or substantially all points on the BREP object, and may be G continuous or substantially G1 continuous at any non-G2 continuous points. In addition, in some embodiments, the BREP object defined by the methods and systems interpolates all or substantially all of the points in the polygonal data. In some embodiments, the BREP object defined by the methods and systems includes all or substantially all of the points in the polygonal data. The methods and systems reliably define BREP objects for polygonal data of a wide variety of polygonal data. While quadrilateral polygonal data is most efficiently processed, some triangular polygonal data may be effectively handled. The BREP objects produced may contain mostly naturally trimmed (rectangular bounded) surfaces with a layout similar to what might be created by a designer in a CAD system. The flow lines of the resulting BREP curves and surfaces may closely match the flow lines of the straight edges on the original data mesh. Surfaces may be roughly rectangular, two manifold, and/or curved. Additionally, surfaces can be of any type, for example, NURBS surface, Bezier surface, Coons surface, Gregory Patch, etc.

A polygonal model or polygonal mesh can be characterized as being, for example, triangular or quadrilateral. In a predominantly triangular mesh, the polygons defined by the data are generally triangular. In a predominantly triangular mesh most polygons are defined by three data points, and each data point is generally a vertex of six triangles. The number of polygons defined by a point is referred to as the valence of that point. The valence of that point is also the number of polygon sides or lines which connect to that point. Accordingly, in a predominantly triangular mesh, most of the data points have a valence of six. In a predominantly quadrilateral mesh, the polygons defined by the data are generally quadrilateral. In a predominantly quadrilateral mesh most polygons are defined by four data points, and each data point is generally a vertex of four quadrilateral polygons. Therefore, in a predominantly quadrilateral mesh, most of the data points have a valence of four. Polygonal data, which is a predominantly quadrilateral mesh, may also include certain valence 3 vertices, valence 4 vertices, and valence 5 vertices.

In order to generate a continuous BREP object, in some embodiments the polygonal data is analyzed and continuous surfaces are formed. The collection of continuous surfaces corresponds to the BREP object represented by the polygonal data, where each surface corresponds to a unique portion of the BREP object represented by the polygonal data. Each of the continuous surfaces forms a portion of the continuous BREP object to be generated. To improve the continuity of the generated BREP object, the boundaries and vertices of the continuous surfaces are modified. The result is a continuous BREP object corresponding to the BREP object represented by the polygonal data.

FIG. 1 is a flowchart illustrating a method 100 used to generate a BREP object data from polygonal data. The method of FIG. 1 is implemented with a computer system, which accesses instructions for performing the method stored on a computer readable medium, such as a memory or data storage device. The instructions are generated using coding techniques and instruction generation techniques understood by those of skill in the art. The instructions, when executed by the computer, cause the method of FIG. 1 to be performed. The polygonal data may be generated with a computer CAD system and may be stored in a non-transitory computer readable medium, such as a memory or data storage device.

At 110 of the method of FIG. 1, the computer system configured to perform or to be used to perform the method of FIG. 1 accesses the polygonal data to perform the method. The polygonal data may be a relatively low resolution representation of a polygonal data model. To increase the resolution, the polygonal data may be subdivided. In some embodiments, the polygonal data may be unsubdivided polygonal data, such as a top level control mesh. In some embodiments, the polygonal data is a subdivided version of a higher level polygonal data model. In some embodiments, the polygonal data includes polygonal data which has been generated, for example, by a 3D scanner. For example, an operator may scan a particular object with a 3D scanner to generate the polygonal data for further processing.

In some embodiments, at 120, after scanning the particular object, the data of the scan is retopologized to generate the polygonal data. Retopologizing may be performed, for example, to convert polygonal data of a less desirable constitution to a more preferred state. For example, data having many small triangular faces, such as a scanned mesh generated by the scanning system may be retopologized to create a polygonal data model having significantly fewer quadrilateral faces. Brep data, subdivided data, a triangular mesh, volumetric representation data, quad-tree data, oct-tree data, or other data may also be preferably retopologized to generate the polygonal data model.

In some embodiments the process of retopologizing, the process includes one or more aspects or features of the retopologizing processes discussed in U.S. application Ser. No. 13/447,111, filed Apr. 13, 2012, which is incorporated herein by reference for all purposes.

In alternative embodiments, the polygonal data is not retopologized.

At 130, the polygonal data or the retopologized polygonal data is subdivided, for example using methods described elsewhere herein. Hereafter the data will be referred to as the polygonal data model regardless of whether or not data was generated through retopologizing. The polygonal data model may be subdivided such that certain subdivision characteristics (discussed in further detail below) are not identical in each of various regions of the polygonal data model.

At 140, multiple bounded areas of the polygonal data model are generated, for example using methods described elsewhere.

At 150 through 190, each of the bounded areas generated at 140 are individually processed according to the processes discussed below with reference to each of 150, 160, 170, 180, and 190.

At 150, a series of vertices are added to the bounded area being processed. The locations of the added vertices correspond with the locations of the most adjacent or nearest vertices of the bounded areas which are adjacent to the bounded area being processed.

At 160, a surface is created based on the polygonal data model of the extended bounded area formed at 150.

The surface as generated at 160 may be unclamped. At 170, the surface generated at 160 is clamped. Clamping techniques, as understood by those of skill in the art, may be used. In alternative embodiments, the surface generated at 160 of the method is not clamped, and is used without clamping at 180.

At 180, the position of certain vertices, for example, but not limited to, corner vertices are changed. The position of the vertices may be changed to, for example, improve smoothness in the regions including the moved vertices. In alternative embodiments, the positions of the vertices are not moved.

At 190, some of the knots are removed from the surface, such that, for example, if the surface is regenerated without the removed knots, the difference between the surface generated without the removed knots may be substantially identical to the surface generated with the removed vertices.

At 195, the surfaces generated for the bounded areas are assembled to generate a surface corresponding with the polygonal data model received at 110. In some embodiments, the boundaries or transitions between the surfaces is G2 continuous at all or substantially all points, and may be G1 continuous at points which are not G2 continuous.

Figure 2:
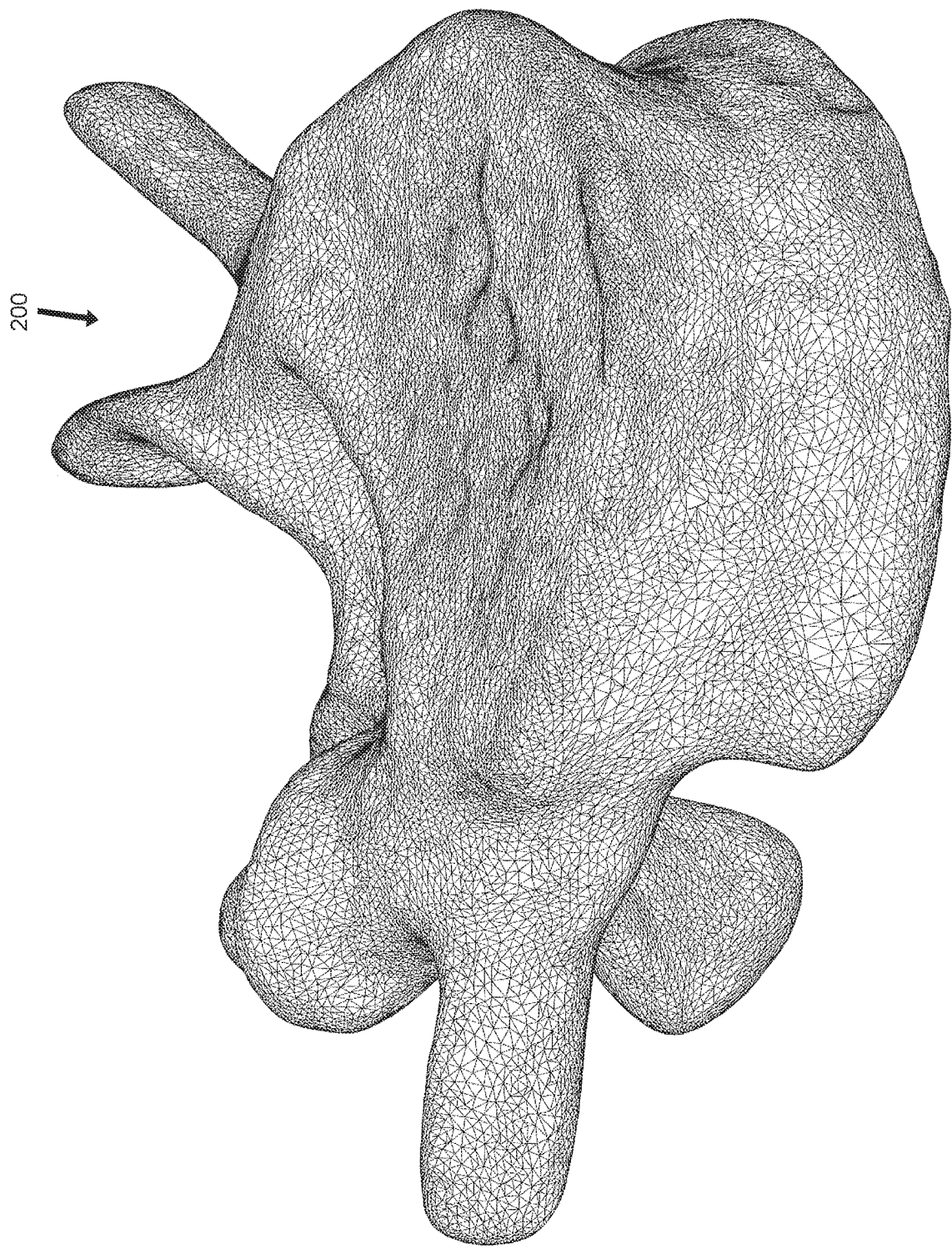
FIG. 2 is an example representation of a scanned mesh received as polygonal data at 110 of the method of FIG. 1.

FIG. 2 is an example representation of a scanned mesh 200 received as polygonal data at 110 of the method of FIG. 1.

Figure 3:
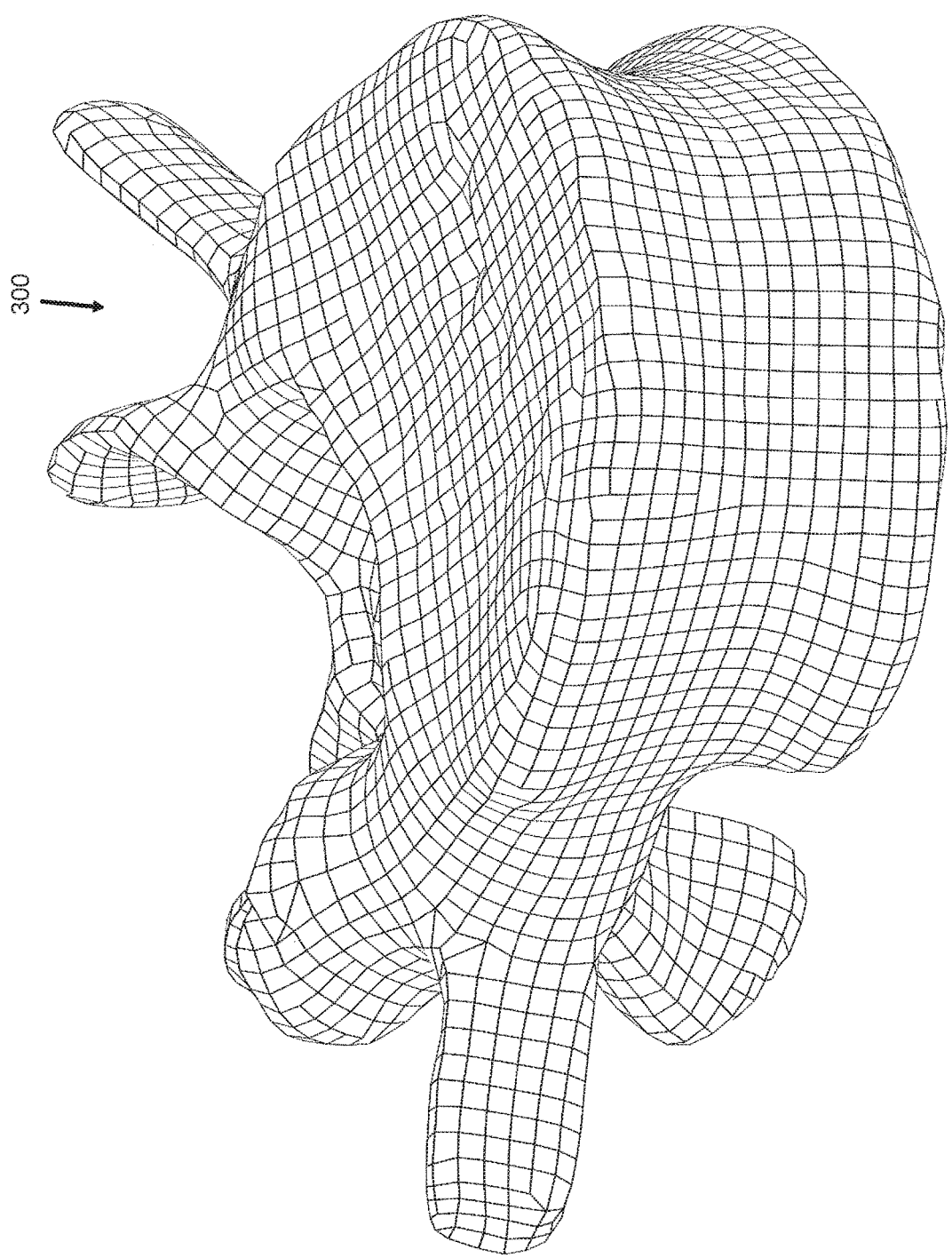
FIG. 3 is an example representation of topologized polygonal data generated by retopologizing the scanned mesh polygonal data at 120 of the method of FIG. 1.

FIG. 3 is an example representation of topologized polygonal data 300 generated by retopologizing the scanned mesh polygonal data at 120 of the method of FIG. 1. The polygonal data illustrated in FIG. 3 may be used for further processing. In some embodiments of retopologizing, the process includes one or more aspects or features of the retopologizing processes discussed in U.S. application Ser. No. 13/447,111, filed Apr. 13, 2012, which is incorporated herein by reference for all purposes.

FIGS. 4-10 illustrate an example of a process which may be used by the computer system configured to perform or to be used to perform the method of FIG. 1 to, at 130 of the method, generate a higher resolution polygonal data model by subdividing polygonal data of lower resolution. In the example of FIGS. 4-10, example polygonal data which is different from that illustrated in FIG. 3 is used. Nonetheless, various aspects of 130 of the method of FIG. 1 are accurately represented in the example of FIGS. 4-10.

As discussed in further detail below, in the method of FIG. 1, at 130, the process of FIGS. 4-10 is performed on the polygonal data model, such that certain subdivision characteristics (also discussed in further detail below) are not identical for each of the various vertices of the polygonal data model.

FIGS. 4-8 illustrate steps which may be used to determine how an example polygonal data mesh 10 may be modified prior to subdivision, so that the result of multiple subdivisions of the modified polygonal data mesh 10 approximately or substantially conforms with example scan mesh 12. In some embodiments, polygonal data mesh 10 is generated by a subdivision process.

In some embodiments, modification vectors are generated for vertices of a subdivided polygonal data mesh. In such embodiments, modification vectors may be generated for vertices that are created by the most recent or greatest resolution subdivision of polygonal data mesh 10. Additionally or alternatively, modification vectors may be generated for vertices that correspond with vertices created by a previous or lesser resolution subdivision of polygonal data mesh 10, or for vertices that correspond with vertices of the unsubdivided polygonal data mesh 10. As corresponding with vertices created by a previous or lesser resolution subdivision, the corresponding vertices may be understood as being the vertices created by the previous or lesser resolution subdivision having been moved to new locations by the subdivision process and the modification vectors.

In the process, described in more detail below, a modification vector is determined for each of the vertices 14 of polygonal data mesh 10. The modification vectors are determined iteratively by subdividing the polygonal data mesh 10, determining differences between the subdivided polygonal data mesh 10 and the scan mesh 12, and generating the modification vectors based on the differences. The iterative process continues for a determined number of iterations, or until a desired conformity, or, for example, a maximum distance between the subdivided polygonal data mesh 10 and the scan mesh 12 is achieved.

Figure 4:
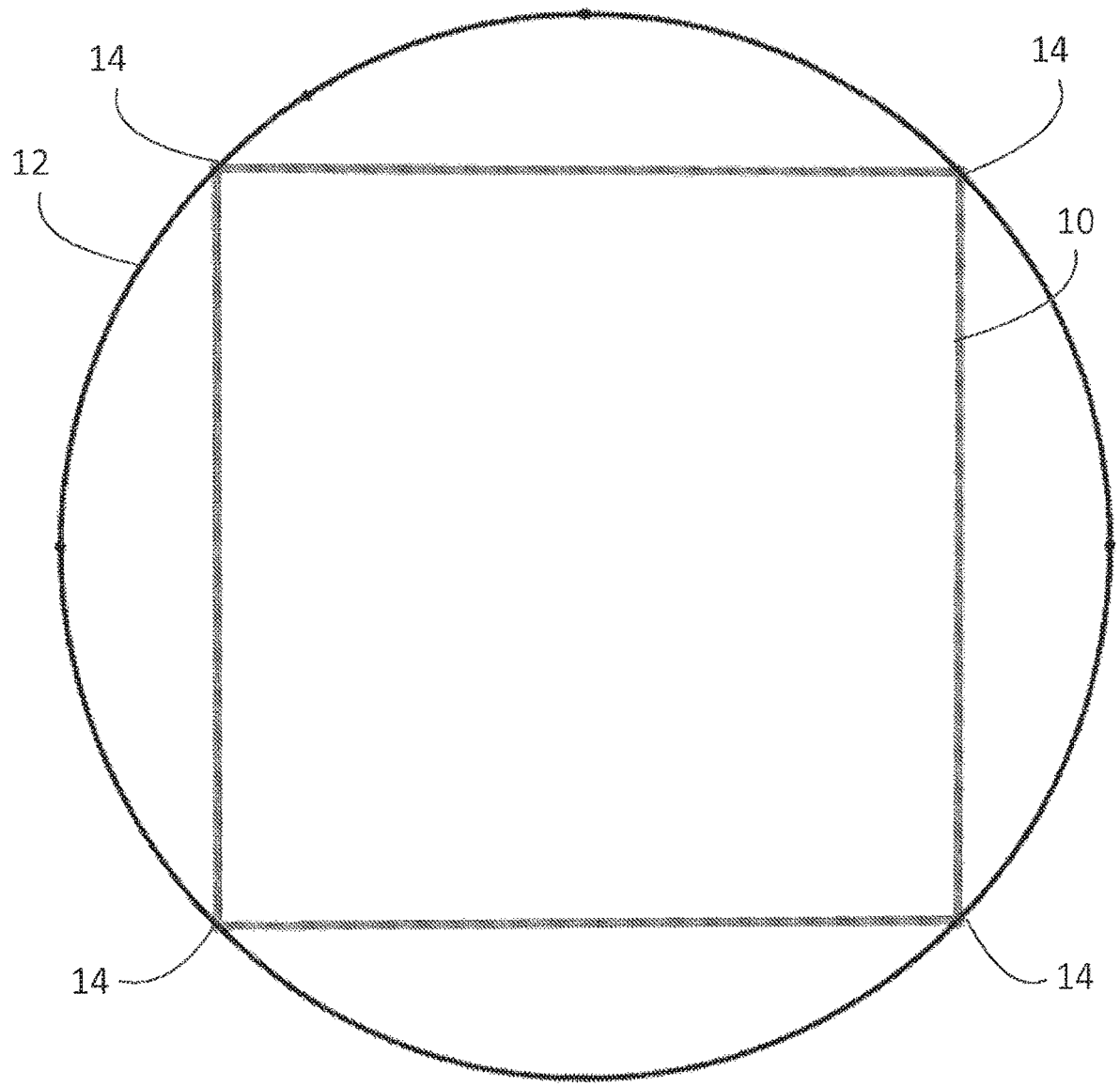
FIG. 4 is a two dimensional view of a polygonal data mesh, a scan mesh, and vertices.

FIG. 4 is a two dimensional view of polygonal data mesh 10, scan mesh 12, and vertices 14. To simplify explanation, the discussion below is directed to two dimensional data. The aspects and principles discussed are analogously applied to data of higher dimensions, such as 3, 4, 5, or more dimensions. As shown, polygonal data mesh 10 has not been subdivided, and has not been modified in preparation for subdivision.

Figure 5:
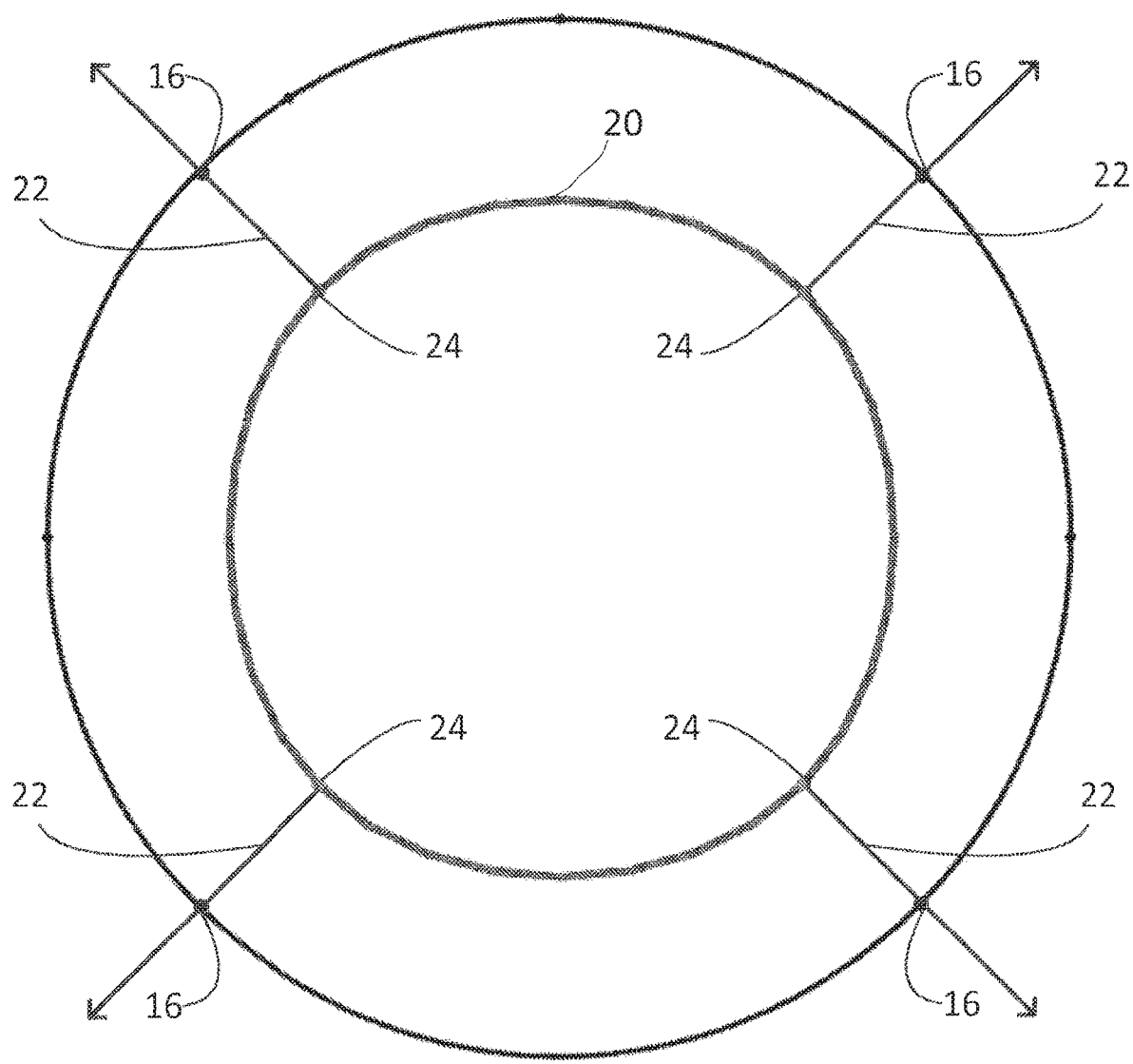
FIG. 5 is a two dimensional view of a polygonal data mesh, which is the result of multiple subdivisions of the polygonal data mesh 10 of FIG. 4 without modification.

FIG. 5 is a two dimensional view of a polygonal data mesh 20, which is the result of multiple subdivisions of the polygonal data mesh 10 of FIG. 4 without modification. As a result of the multiple subdivisions, polygonal data mesh 20 includes numerous vertices and numerous edges, where each edge connects adjacent vertices. Four vertices 24 correspond with vertices 14 of polygonal data mesh 10 of FIG. 4. As corresponding with vertices 14, vertices 24 may be understood as being vertices 14 having been moved to new locations by the subdivision process. In contrast, the additional vertices (not indicated in FIG. 4) of polygonal data mesh 20 were generated by the subdivision process. Locations 16 indicate positions of vertices 14 of polygonal data mesh 10 prior to subdivision.

Modification vectors for vertices 14 may be determined based on the difference between the locations of vertices 24 and scan mesh 12.

The direction of each modification vector may be determined, for example, based on a ray 22 beginning at each vertex 24 and passing through the location 16 corresponding with the vertex 14 associated with the vertex 24. In some embodiments, the direction of each modification vector is the direction defined by the corresponding ray 22. In some embodiments, the direction of each modification vector varies from the direction defined by the corresponding ray 22, and 15 may be based on other geometries of at least one of the scan mesh 12, the polygonal data mesh 10, and the polygonal data mesh 24.

The magnitude of each modification vector may be determined, for example, based on the distance between each vertex 24 and the corresponding location 16. In some embodiments, locations 16 is not coincident with the scan mesh 12. In such embodiments, the magnitude of each modification vector may be determined, for example, based on the distance between each vertex 24 and a corresponding location on the scan mesh, where the corresponding location on the scan mesh is determined to be the point on the scan mesh nearest the vertex 24 in the direction of ray 22. In some embodiments, the magnitude of each modification vector is equal to or is substantially equal to the magnitude of the distance between each vertex 24 and the corresponding location on the scan mesh. In some embodiments, the magnitude of each modification vector varies from the magnitude of the distance between each vertex 24 and the corresponding location on the scan mesh, and is based on other geometries of at least one of the scan mesh 12, the polygonal data mesh 10, and the polygonal data mesh 20. In some embodiments, the magnitude of each modification vector varies the magnitude of the distance each vertex 24 and the corresponding location on the scan mesh by a constant distance or by a constant factor.

Figure 6:
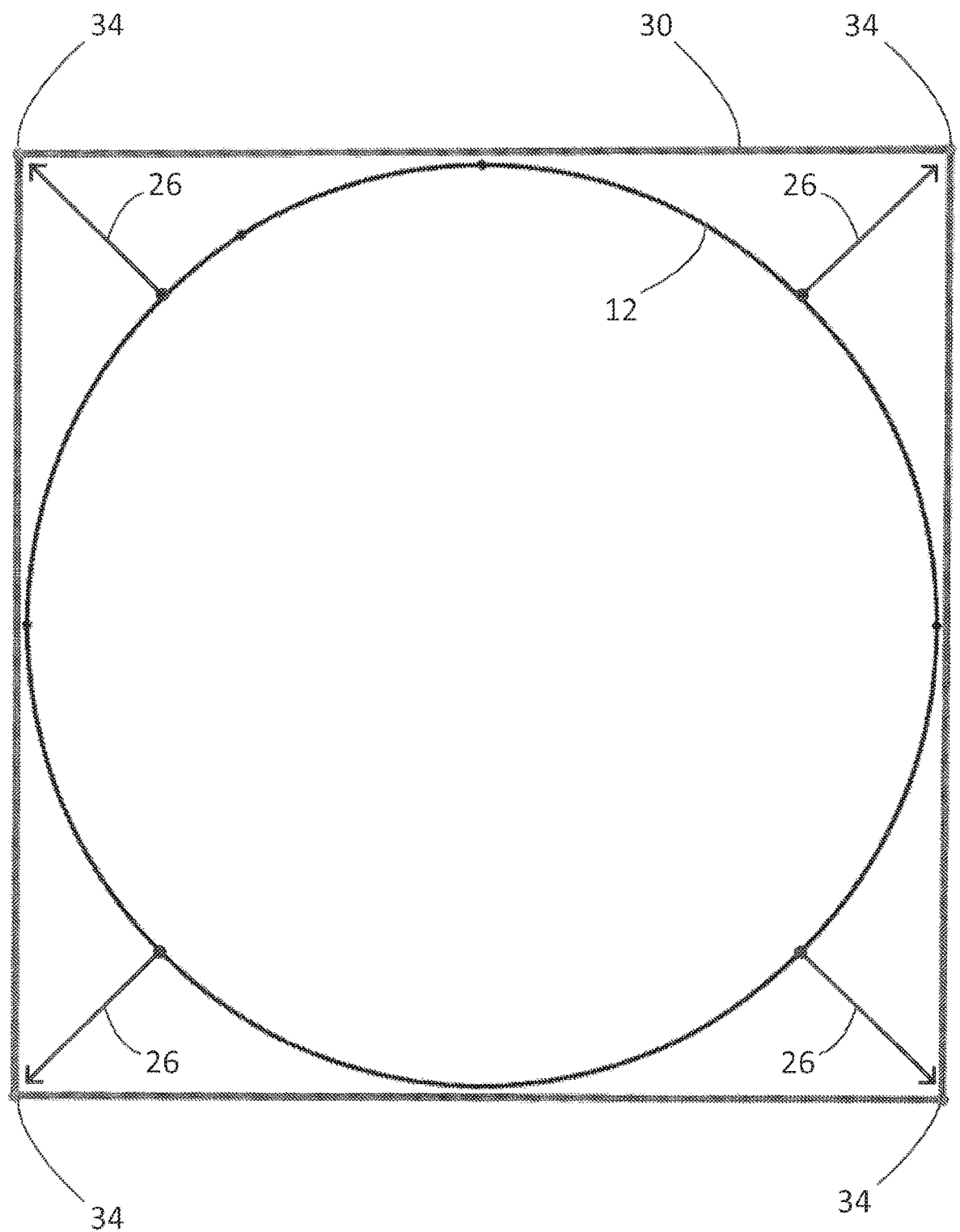
FIG. 6 is a two dimensional view of a polygonal data mesh and a scan mesh.

FIG. 6 is a two dimensional view of a polygonal data mesh 30 and scan mesh 12. Polygonal data mesh 30 is generated as the result of modifying the vertices 14 of polygonal data mesh 10 of FIG. 4 based on modification vectors 26. The modification vectors 26 may be determined, for example, as discussed above with reference to FIG. 5.

FIG. 6 also identifies locations 16 which indicate positions of unmodified vertices 14 of polygonal data mesh 10. As shown, the differences between unmodified vertices 14 of polygonal data mesh 10 and corresponding vertices 34 of polygonal data mesh 30 are 10 respectively defined by the corresponding modification vectors 26.

Figure 7:
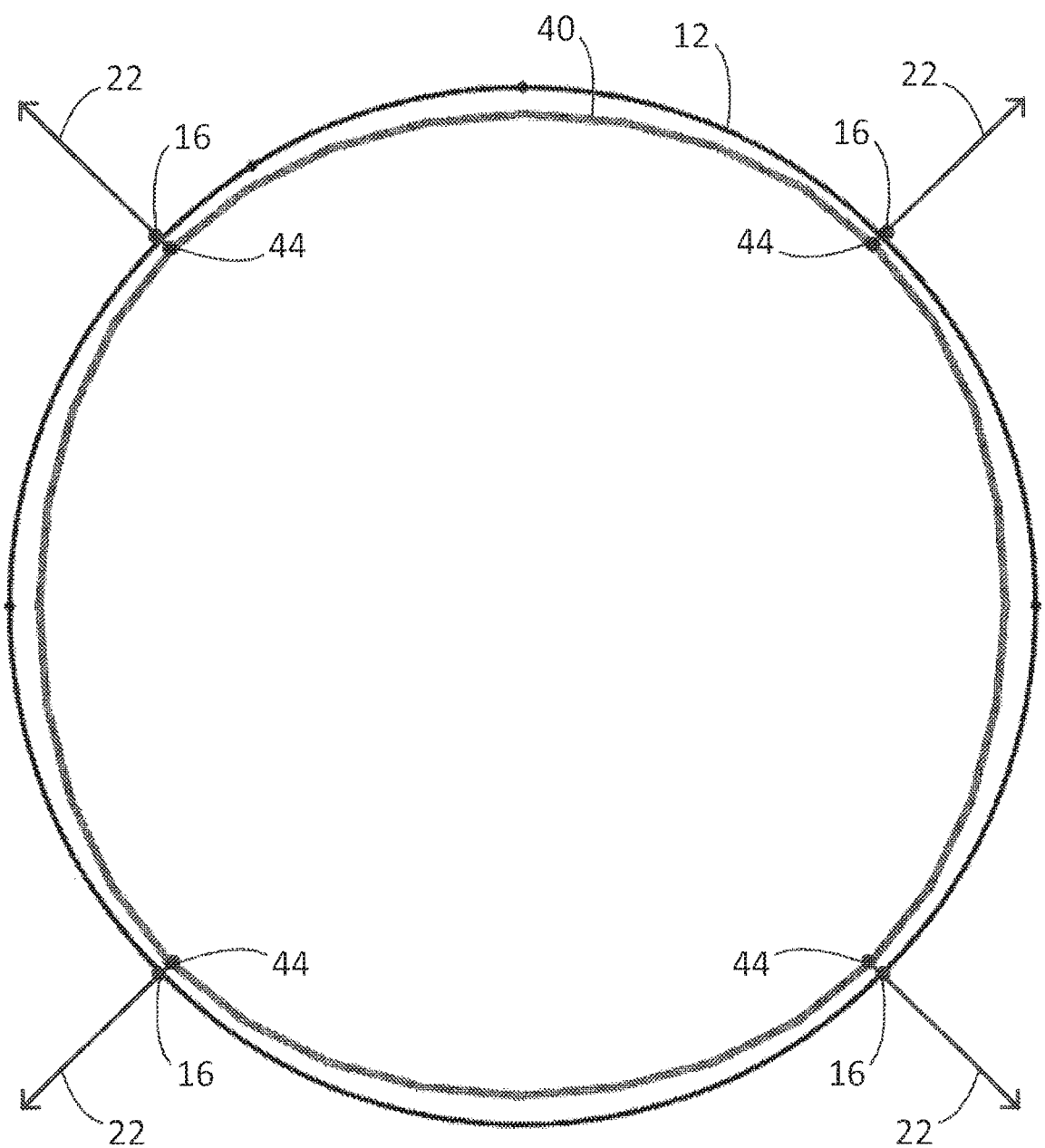
FIG. 7 is a two dimensional view of a polygonal data mesh, which is the result of multiple subdivisions of the polygonal data mesh 30 of FIG. 6.

FIG. 7 is a two dimensional view of a polygonal data mesh 40, which is the result of multiple subdivisions of the polygonal data mesh 30 of FIG. 6. As a result of the multiple subdivisions, polygonal data mesh 40 includes numerous vertices and numerous edges, where each edge connects adjacent vertices. Four vertices 44 correspond with vertices 14 of polygonal data mesh 10 of FIG. 4 and with vertices 34 of polygonal data mesh 30 of FIG. 6. As corresponding with vertices 14 and 34, vertices 44 may be understood as being vertices 14 or 34 having been moved to new locations by the subdivision process and the modification vectors. In contrast, the additional vertices (not indicated in FIG. 4) of polygonal data mesh 20 were generated by the subdivision process. Locations 16 indicate positions of vertices 14 of polygonal data mesh 10 of FIG. 4.

Comparing FIG. 7 and FIG. 5 reveals that the polygonal data mesh 40, generated by subdividing the modified polygonal data mesh 20 is significantly more conformant to scan mesh 12 than polygonal data mesh 20, generated by subdividing the unmodified polygonal data mesh 10.

To further improve conformity, modification vectors for vertices 14 may be updated based on the results of the subdivision of polygonal data mesh 30. The updated modification vectors may be determined based on the difference between the locations of vertices 44 and scan mesh 12. For example, the modification vectors may be updated by the addition of an update vector thereto. The determination of the update vector may be similar to the determination of the modification vectors described above with reference to FIG. 5. Other equivalent or similar processes for updating the modification vectors may also be used.

Figure 8:
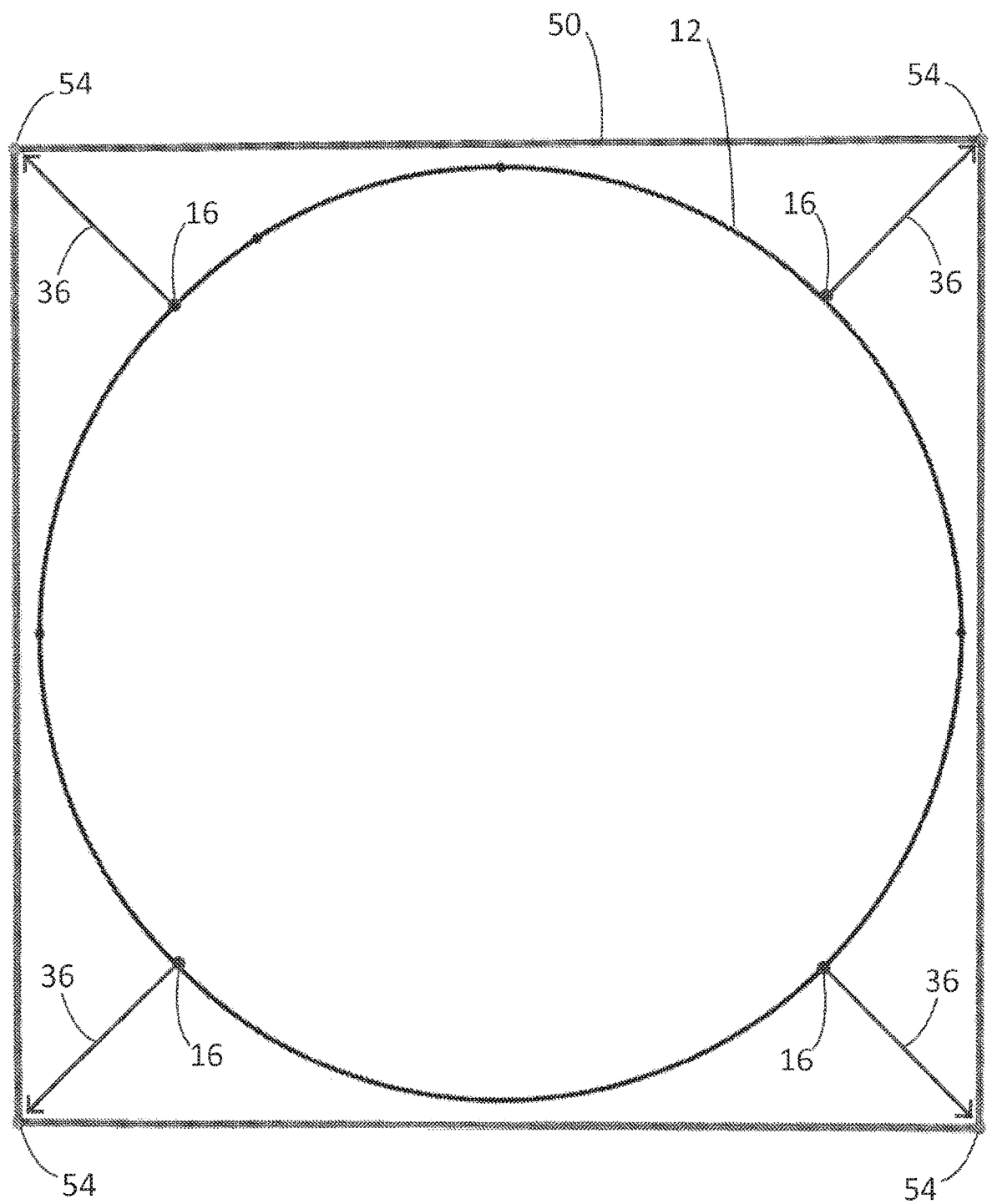
FIG. 8 is a two dimensional view of a polygonal data mesh and a scan mesh.

FIG. 8 is a two dimensional view of a polygonal data mesh 50 and scan mesh 12. Polygonal data mesh 50 may be generated as the result of modifying the vertices 14 of polygonal data mesh 10 of FIG. 4 based on modification vectors 36. The modification vectors 36 may be determined, for example, as discussed above with reference to FIG. 7. In some embodiments, polygonal data mesh 50 may be generated as the result of modifying the vertices 34 of polygonal data mesh 30 of FIG. 6 based on update vectors. The update vectors may, for example, be calculated based on the difference between positions of vertices 44 of polygonal data mesh 40 of FIG. 7 and locations 16.

FIG. 8 also identifies locations 16 which indicate positions of unmodified vertices 14 of polygonal data mesh 10. As shown, the differences between unmodified vertices 14 of polygonal data mesh 10 and corresponding vertices 54 of polygonal data mesh 50 are respectively defined by the corresponding modification vectors 36.

The process of modifying the vertex positions prior to subdivision may continue a predetermined number of iterations, or may continue until a desired conformity is achieved. The desired conformity may, for example, be measured by an absolute distance between scan mesh 12 and a subdivided polygonal data mesh. In some embodiments, desired conformity may, for example, be determined based on an improvement of conformity between the results of the current iteration and either a next previous iterations or an initial subdivision. Other methods of measuring and determining adequate conformity may alternatively or additionally be used.

In some embodiments, the process of modifying vertex positions prior to subdivision continues for each particular vertex until each particular vertex achieves a desired conformity. Consequently, in such embodiments, each particular vertex is associated with a number of modification vectors, and some vertices are associated with a different number of modification vectors that other vertices.

Figure 9:
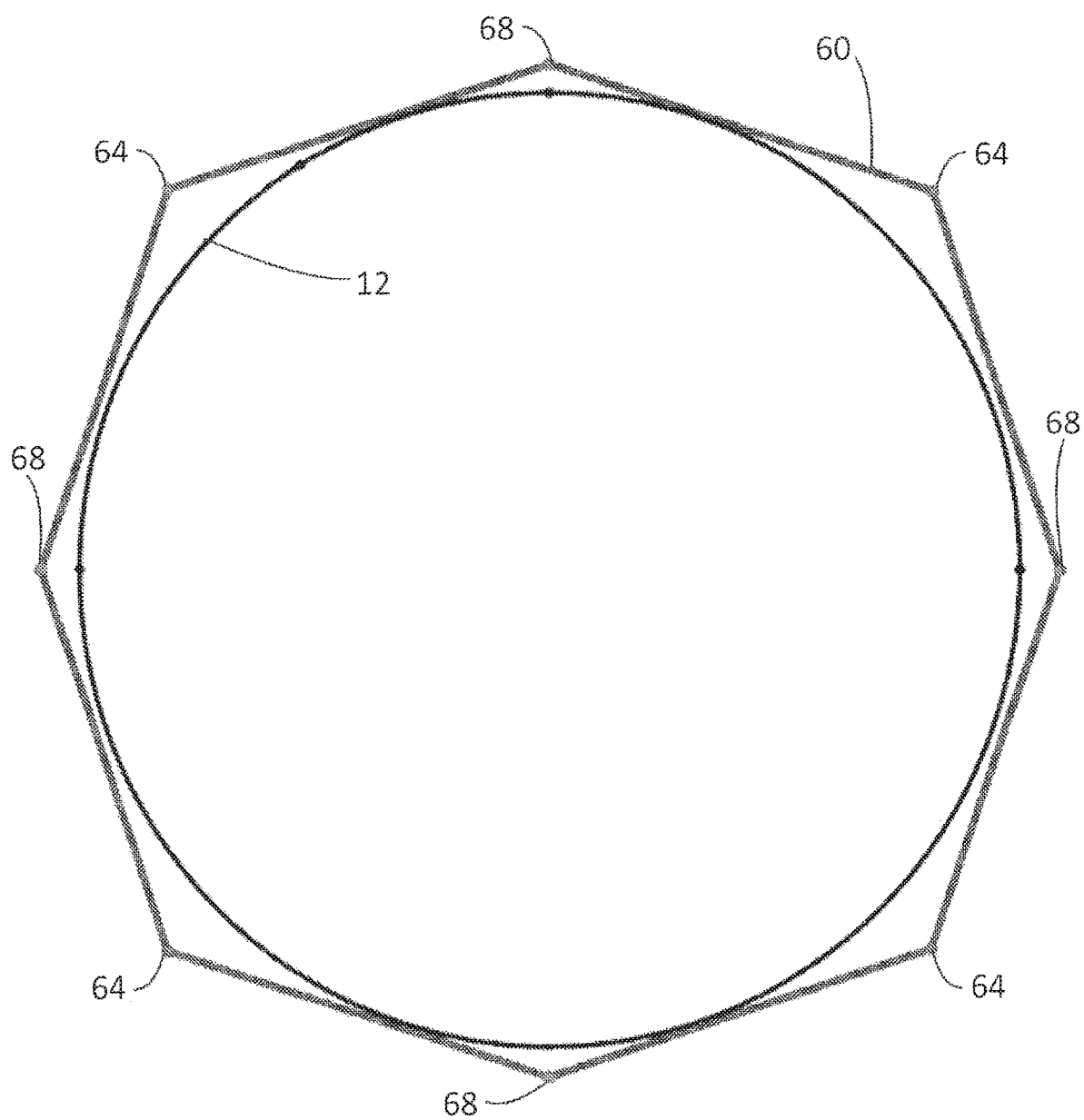
FIG. 9 is a two dimensional view of a polygonal data mesh and a scan mesh.
Figure 10:
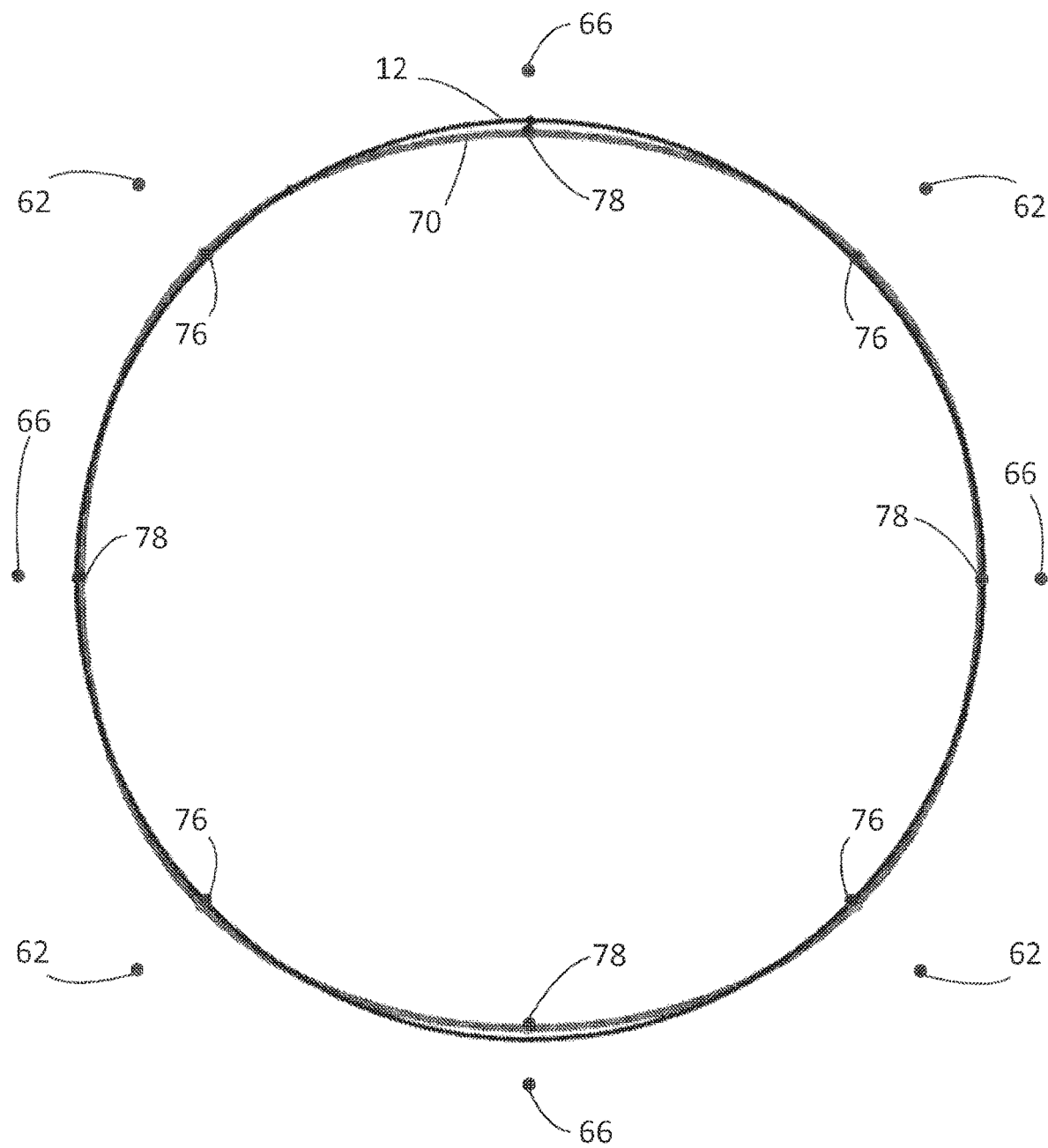
FIG. 10 is a two dimensional view of a polygonal data mesh, which is the result of multiple subdivisions of the polygonal data mesh 60 of FIG. 9 without modification.

FIGS. 9-10 illustrate steps which may be used to generate a polygonal data model by subdividing polygonal data modified as described with reference to FIGS. 4-8. In alternative embodiments, other subdivision processes may be used.

FIG. 9 is a two dimensional view of a polygonal data mesh 60 and scan mesh 12. Polygonal data mesh 60 is generated as the result of subdividing polygonal data mesh 50 of FIG. 8 once. As shown, polygonal data mesh 60 includes vertices 64 and vertices 68.

Vertices 64 correspond with vertices 54 of polygonal data mesh 50 of FIG. 8, which correspond with vertices 14 of polygonal data mesh 10 of FIG. 4, where the correspondence is similar to that discussed elsewhere herein. Accordingly, the positions of vertices 64 are determined by the positions of vertices 14 of polygonal data mesh 10 of FIG. 4 as modified by modification vectors prior to subdivision.

Vertices 68 are generated by the subdivision process. To further improve the conformity of the multiply subdivided polygonal data mesh with scan mesh 12, vertices 68 may be modified based on modification vectors. Additionally or alternatively, vertices 64 may be modified based on modification vectors.

FIG. 10 is a two dimensional view of a polygonal data mesh 70, which is the result of multiple subdivisions of the polygonal data mesh 60 of FIG. 9 without modification. As a result of the multiple subdivisions, polygonal data mesh 70 includes numerous vertices and numerous edges, where each edge connects adjacent vertices. Four vertices 78 correspond with vertices 68 of polygonal data mesh 60 of FIG. 9. As corresponding with vertices 68, vertices 78 may be understood as being vertices 68 having been moved to new locations by the subdivision process and the modification vectors. Four vertices 76 correspond with vertices 64 of polygonal data mesh 60 of FIG. 9. As corresponding with vertices 64, vertices 76 may be understood as being vertices 64 having been moved to new locations by the subdivision process and the modification vectors. In contrast, the additional vertices (not indicated in FIG. 10) of polygonal data mesh 70 were generated by the subdivision process. Locations 66 indicate positions of vertices 68 of polygonal data mesh 60 prior to subdivision. Locations 62 indicate positions of vertices 64 of polygonal data mesh 60 prior to subdivision.

Modification vectors for vertices 68 may be determined based on the difference between the locations of vertices 78 and scan mesh 12. For example, calculation of modification vectors for vertices 68 may be similar to the calculations described above with reference to FIG. 5, of modification vectors for vertices 14.

Modification vectors for vertices 64 may be determined based on the difference between the locations of vertices 76 and scan mesh 12. For example, calculation of modification vectors for vertices 64 may be similar to the calculations described above with reference to FIG. 5, of modification vectors for vertices 14.

Figure 11:
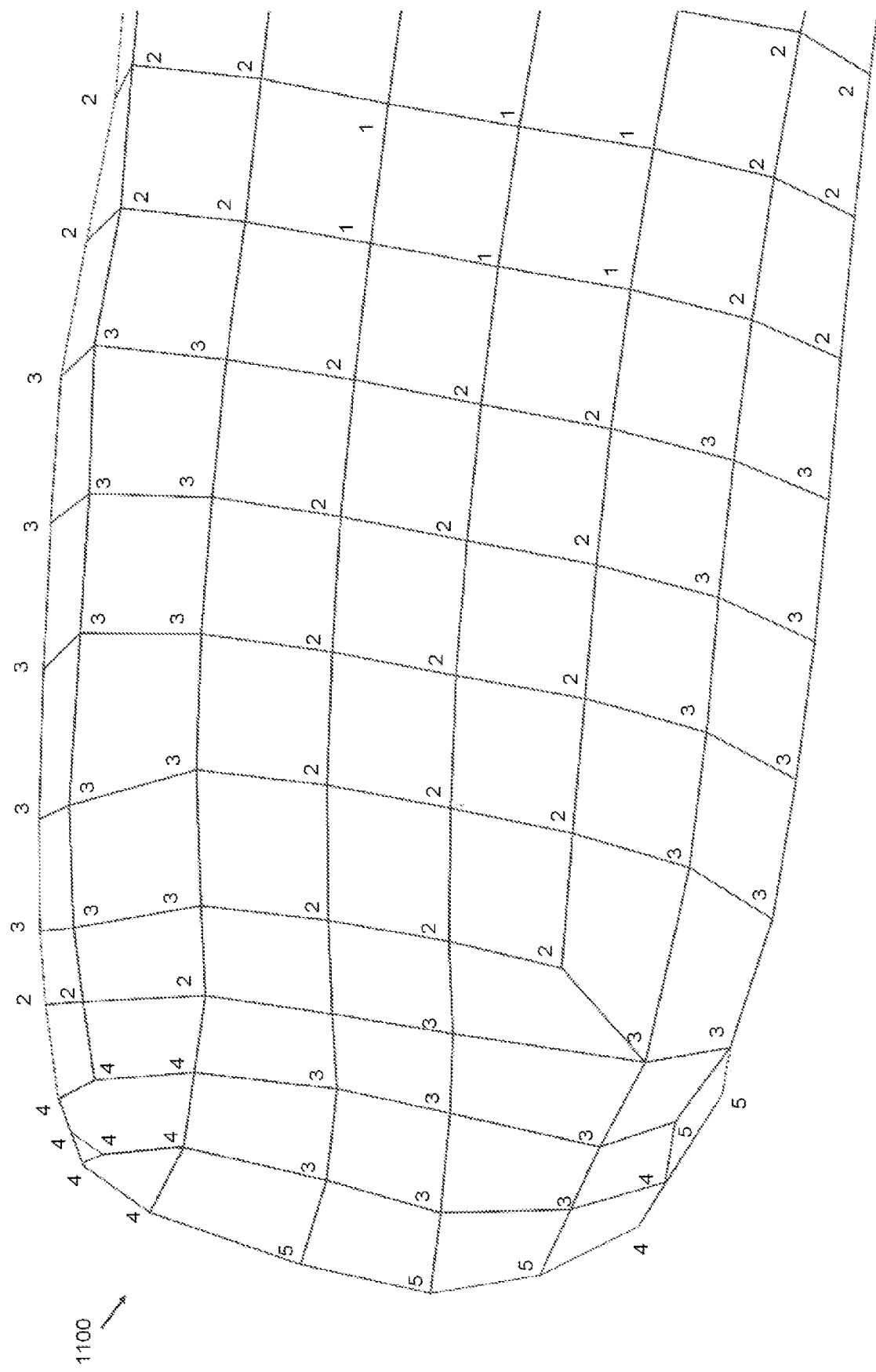
FIG. 11 illustrates a portion of topologized polygonal data.

FIG. 11 illustrates a portion 1100 of topologized polygonal data 300. At 130 of the method of FIG. 1, each of the illustrated vertices is given or is associated with a number of modification vectors, where each of the modification vectors corresponds with a particular level of subdivision, as described above. Alternatively, in some embodiments, each of the illustrated vertices may be given or may be associated with a number of levels of subdivision, where each of the numbers corresponds with the number of levels of subdivision the associated vertex is to undergo.

FIG. 11 is annotated so as to indicate the number of modification vectors or subdivision levels for each vertex. As shown, various regions of vertices having the same number of modification vectors or subdivision levels are formed.

At 140 of the method of FIG. 1, the computer system configured to perform or to be used to perform the method of FIG. 1 creates multiple bounded areas of the polygonal data model.

Figure 12:
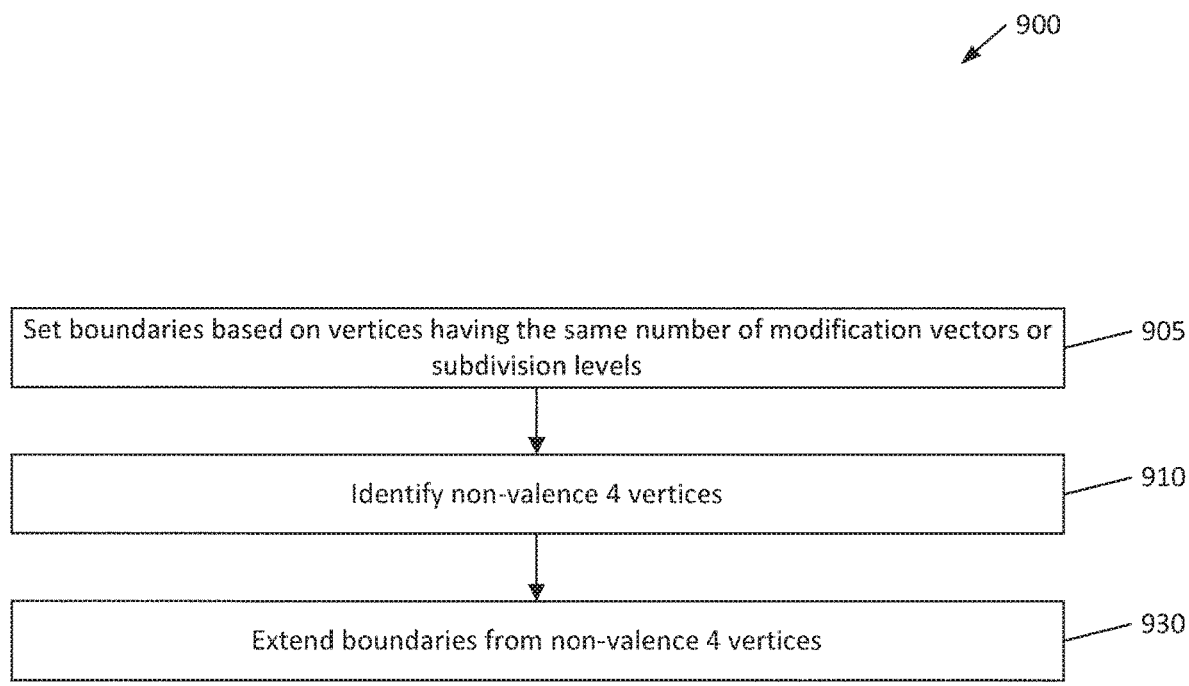
FIG. 12 illustrates a flowchart of a method which may be used to create multiple bounded areas of the polygonal data model.

FIG. 12 illustrates a flowchart of a method 1200 which may be used to create multiple bounded areas of the polygonal data model. FIGS. 13-16 illustrate examples of certain steps of the method. In alternative embodiments, other processes may be used to create multiple bounded areas of the polygonal data model.

The method of FIG. 12 is implemented with a computer system, which accesses instructions for performing the method stored on a computer readable medium, such as a memory or data storage device. The instructions, when executed by the computer, cause the method of FIG. 12 to be performed. The polygonal data may be generated with a computer CAD system, for example, as discussed elsewhere herein, and may be stored in a non-transitory computer readable medium, such as a memory or data storage device. The computer system configured to perform or to be used to perform the method of FIG. 12 accesses the polygonal data to perform the method.

At 905 of FIG. 12, as discussed in further detail below at least with reference to FIG. 13, boundaries are generated based on vertices having the same number of modification vectors or subdivision levels.

At 910 of FIG. 12, as discussed in further detail below at least with reference to FIG. 14, the data is analyzed to identify vertices which are not valence 4.

At 930 of FIG. 12, as discussed in further detail below, the non-valence 4 vertices identified at 910 are used to create additional boundaries.

Figure 13:
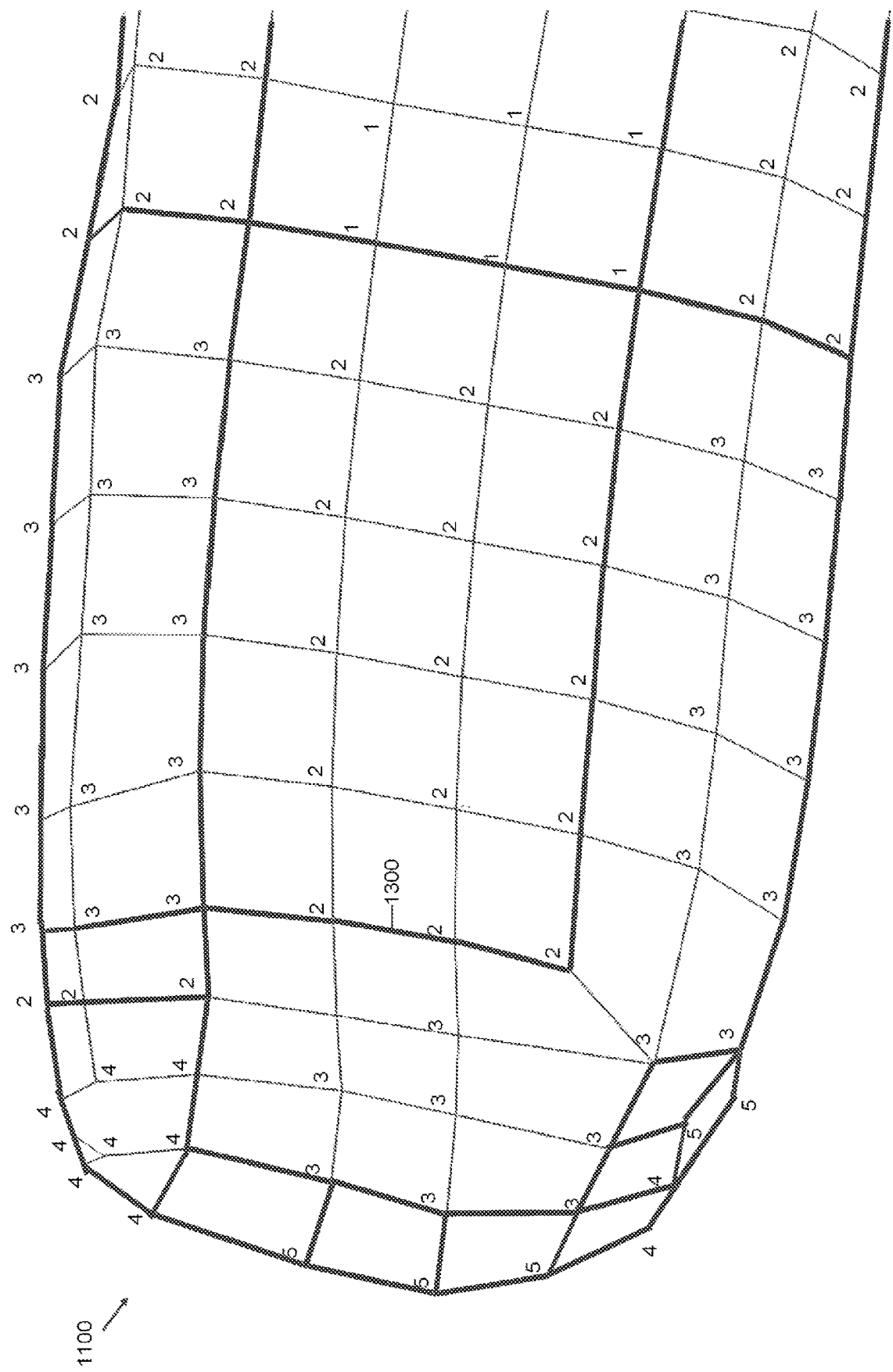
FIGS. 13-16 illustrate examples of certain steps of the method of FIG. 12.

FIG. 13 illustrates data 1100 having boundaries 1300 generated at 905 of method 1200 of FIG. 12. The boundaries are indicated by thicker lines, and, in this embodiment, are generated so as to define areas having contiguous polygons each having a lower left vertex with the same number of modification vectors or subdivision levels associated therewith as the lower left vertices of each of the other polygons in the area.

Figure 14:
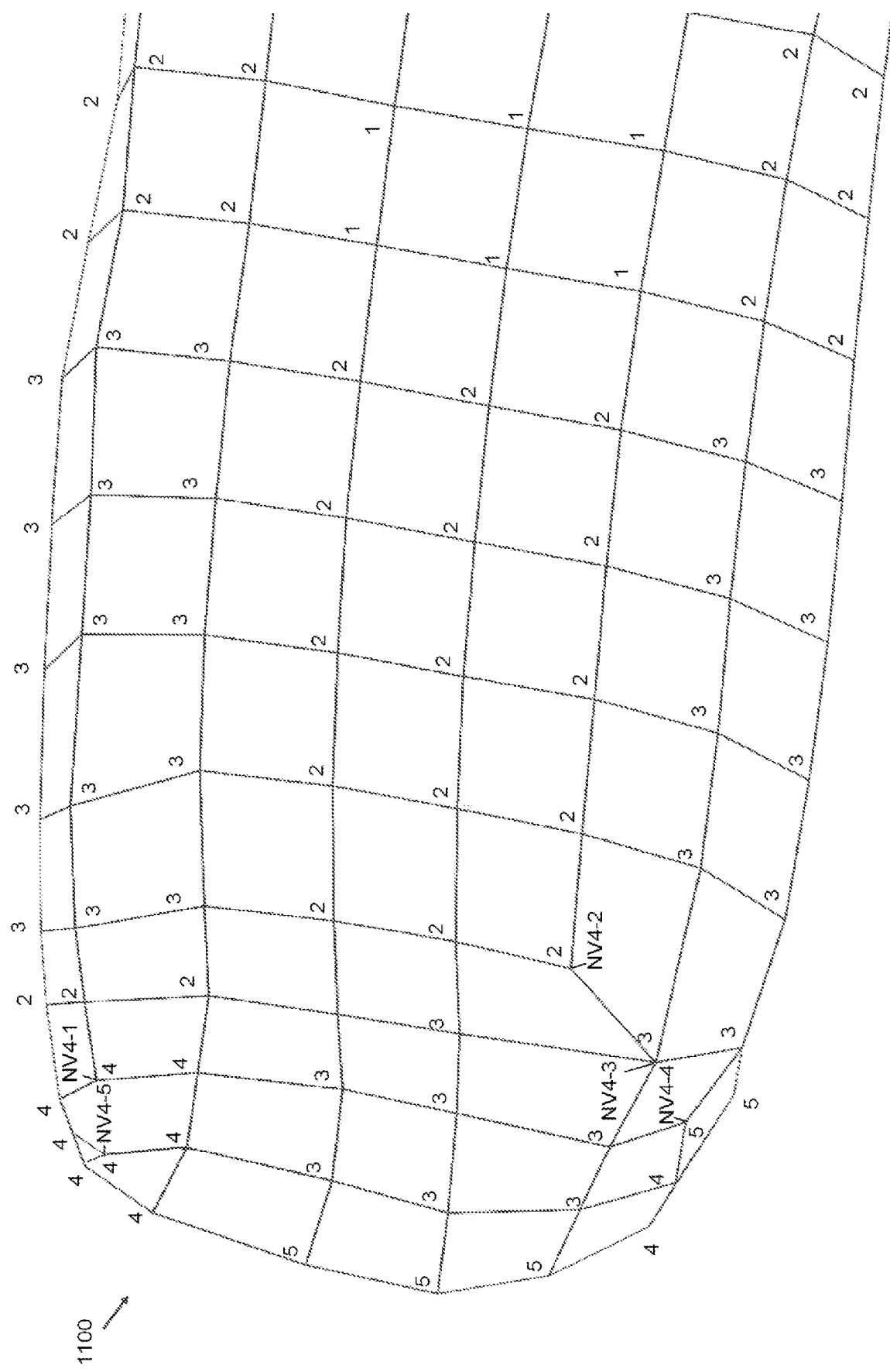

FIG. 14 illustrates data 1100 having certain vertices indicated which are not valence 4. As shown, vertex NV4-1 has valence 3, vertex NV4-2 has valence 5, vertex NV4-3 has valence 3, and vertex NV4-4 has valence 3, and vertex NV4-5 has valence 3. Non-valence 4 vertices NV4-1, NV4-2, NV4-3, NV4-4, and NV4-5 are identified at 910 of method 1200 of FIG. 12.

FIGS. 15A-15E illustrate the formation of additional boundaries 1500A, 1500B, and 1500C; 1600A, 1600B, and 1600C; and 1700A, 1700B, and 1700C as created at 910 of method 1200 of FIG. 12.

Figure 15A:
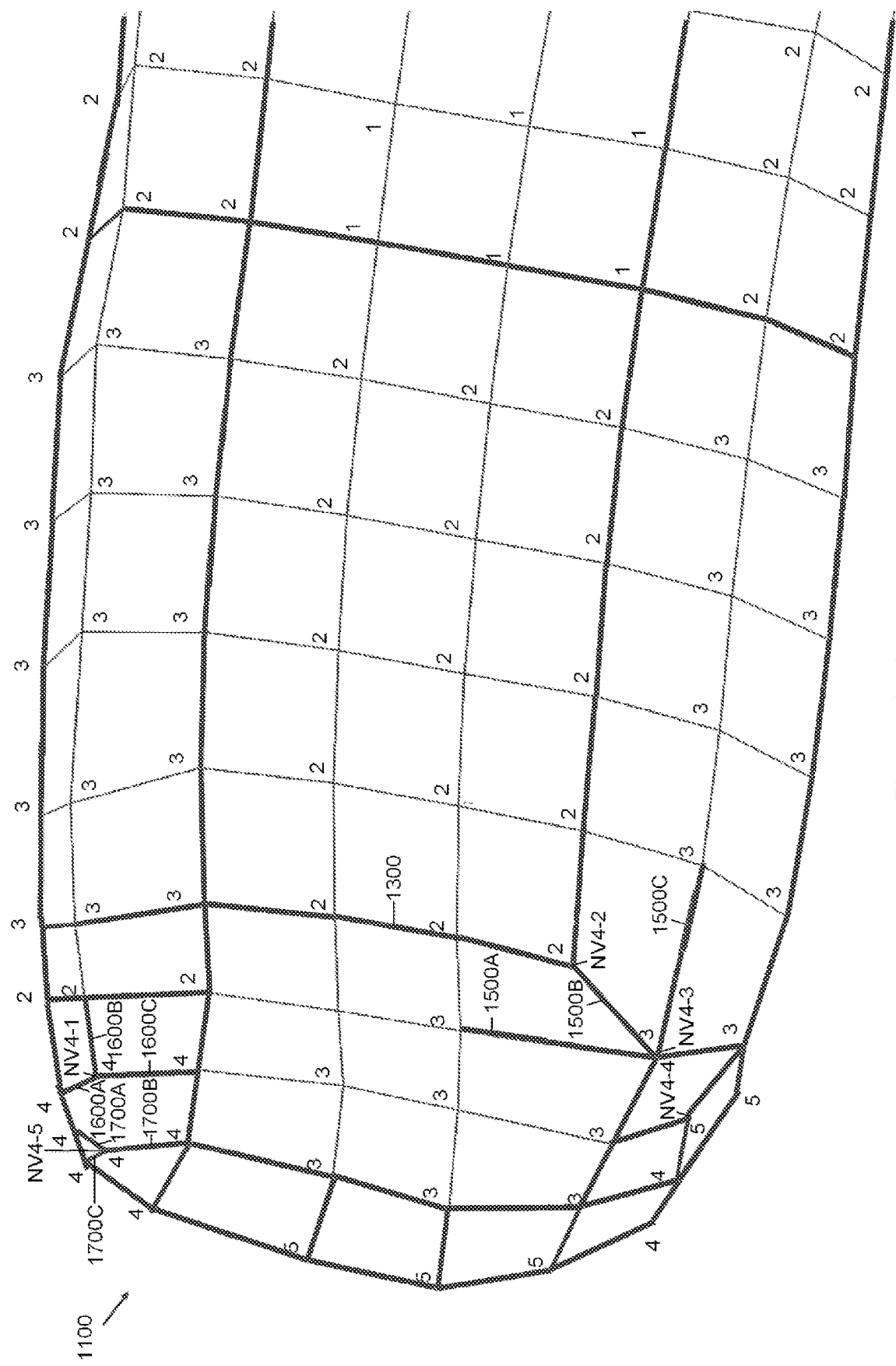

FIG. 15A illustrates data 1100 having additional boundaries 1500A, 1500B, and 1500C; 1600A, 1600B, and 1600C; and 1700A, 1700B, and 1700C which extend from non-valence 4 vertices identified at 910 of method 1200 of FIG. 12. Additional boundaries 1500A, 1500B, and 1500C; 1600A, 1600B, and 1600C; and 1700A, 1700B, and 1700C are conditional extended from non-valence 4 vertices according to a set of extension rules. The rules for conditionally extending the boundary segments may or may not include:

Boundaries are extended to a next vertex from non-valence 4 vertices.

Boundaries are not extended if the last included vertex is non-valence 4.

The boundary of the polygonal data forms boundaries.

Boundaries are not extended if the last included vertex is on or part of another boundary.

Other rules may be applied. For example, some embodiment use various aspects of the methods of extending boundary segments discussed in U.S. Pat. No. 8,994,724, issued Mar. 31, 2015, which is incorporated herein by reference for all purposes.

No additional boundaries extend from non-valence 4 vertex NV4-4 because each of the paths from non-valence 4 vertex NV4-4 is already on a boundary generated at 905 of method 1200 of FIG. 12.

Additional boundaries 1500A and 1500C extend from non-valence 4 vertex NV4-3. In addition, boundary 1500B extends from either of non-valence 4 vertex NV4-2 and non-valence 4 vertex NV4-3.

Additional boundaries 1600A, 1600B, and 1600C extend from non-valence 4 vertex NV4-1.

Additional boundaries 1700A, 1700B, and 1700C extend from non-valence 4 vertex NV4-5.

Figure 15B:
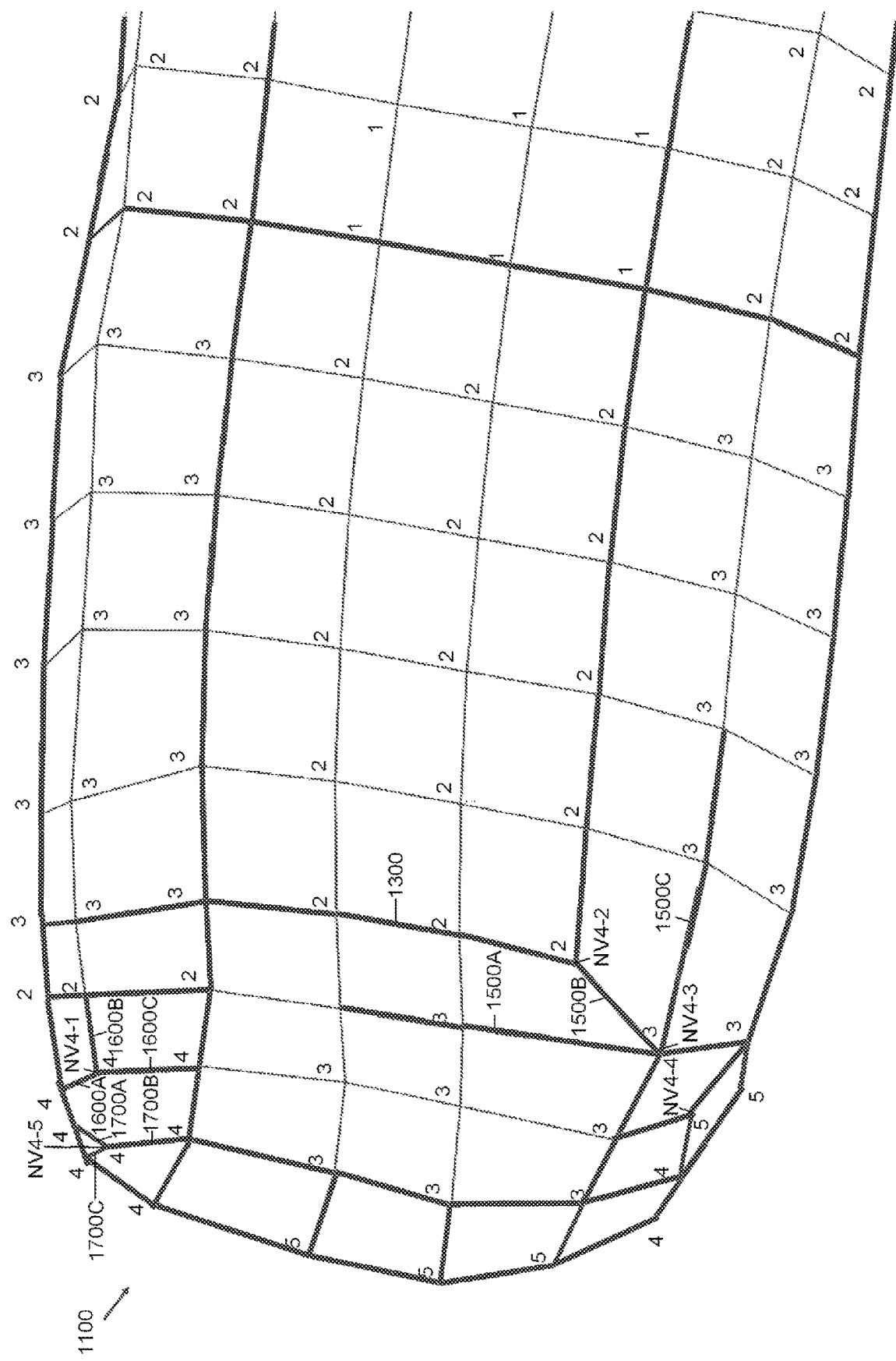

FIG. 15B illustrates data 1100 having additional boundaries 1500A and 1500C which further extend from non-valence 4 vertex NV4-3. Additional boundaries 1500B, 1600B, 1600C, and 1700B are not further extended because the previous vertex added thereto is included in a previously defined boundary. Additional boundaries 1600A, 1700A, and 1700C may be further extended by wrapping around to the other (unillustrated) side of data 1100 according to the extension rules which apply to the data 1100 of the model on the other (unillustrated) side of data 1100.

Figure 15C:
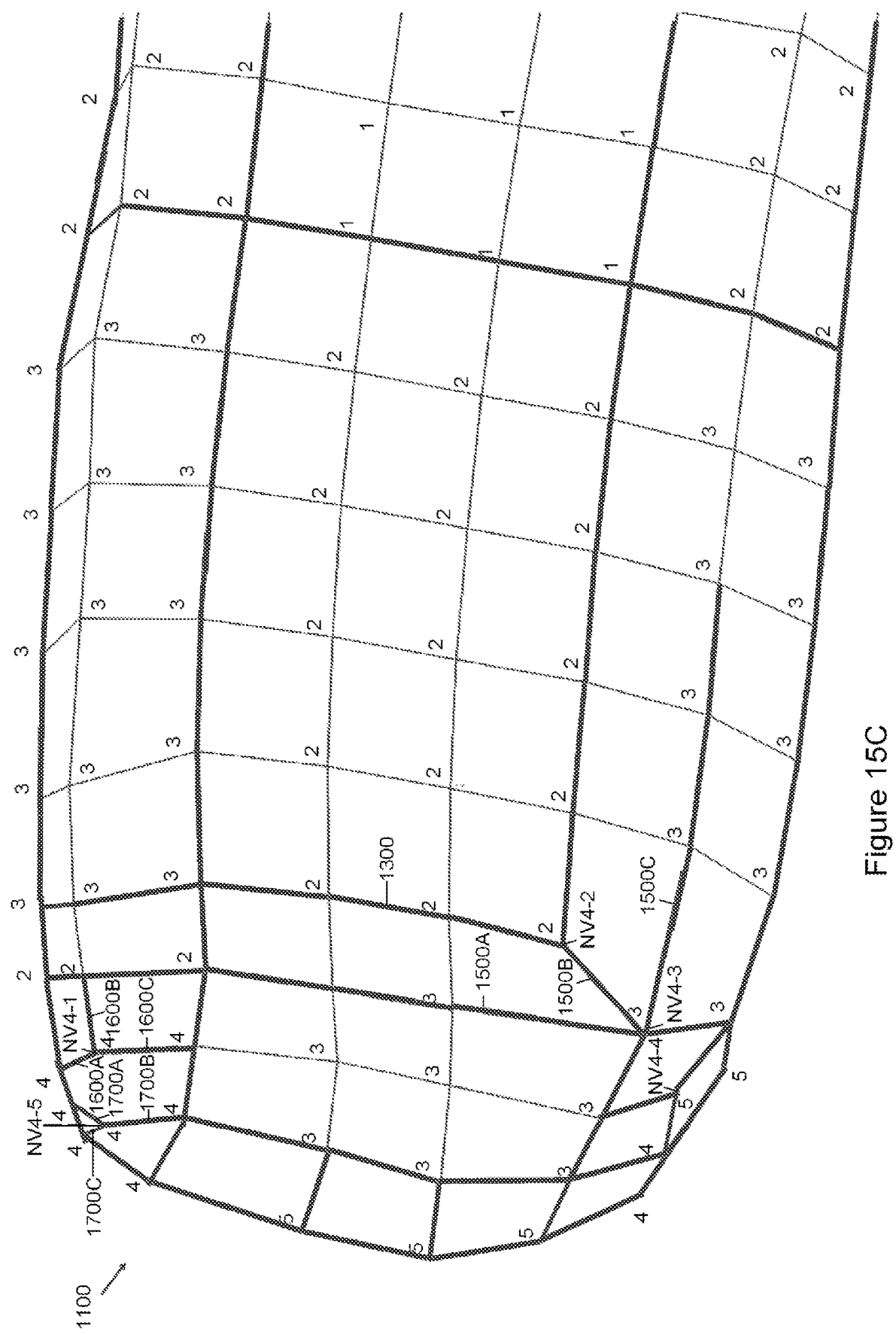

FIG. 15C illustrates data 1100 having additional boundaries 1500A and 1500C which further extend from non-valence 4 vertex NV4-3.

Figure 15D:
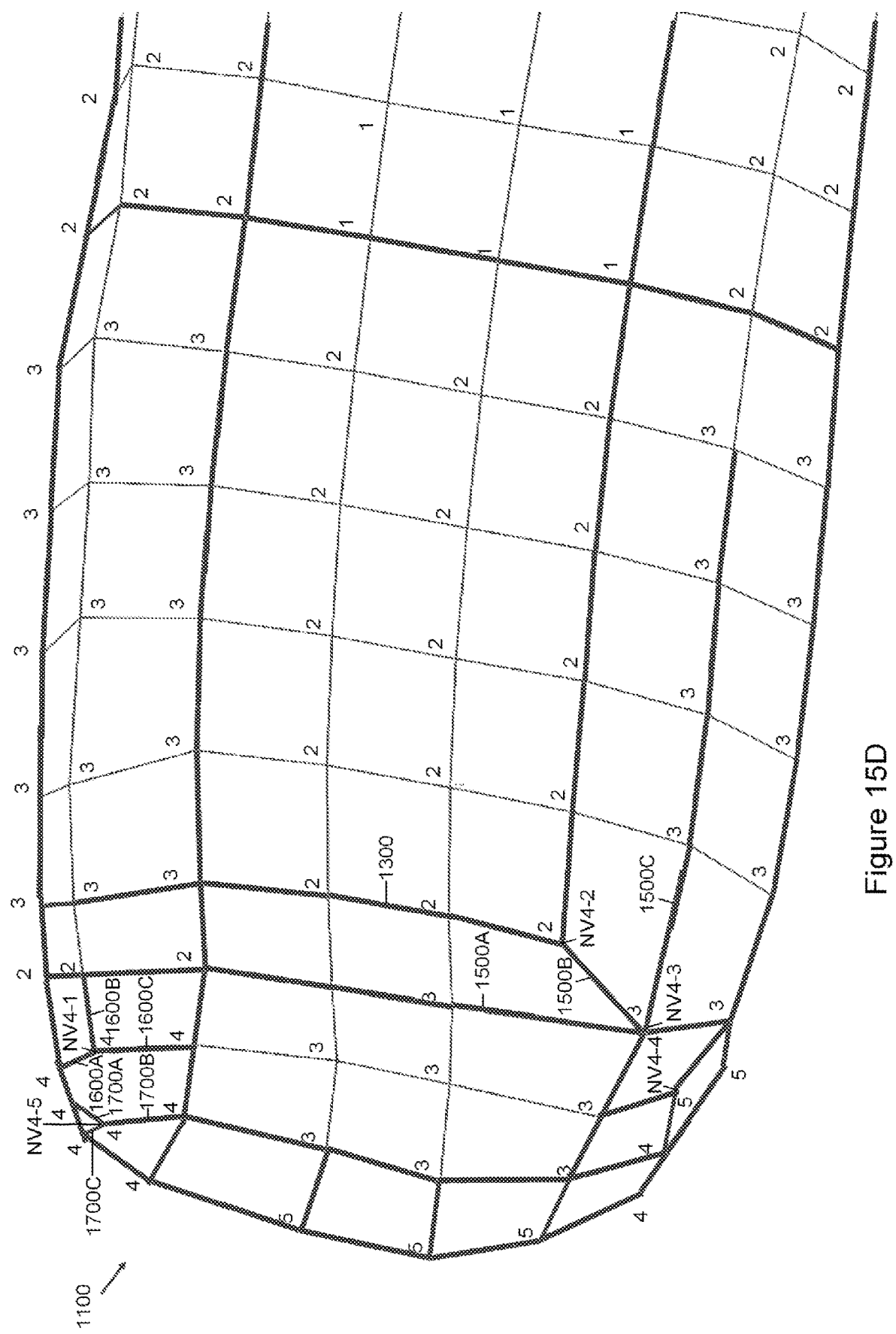

FIG. 15D illustrates data 1100 having additional boundary 1500C which further extends from non-valence 4 vertex NV4-3. Additional boundary 1500A is not further extended because the previous vertex added thereto is included in a previously defined boundary.

Figure 15E:
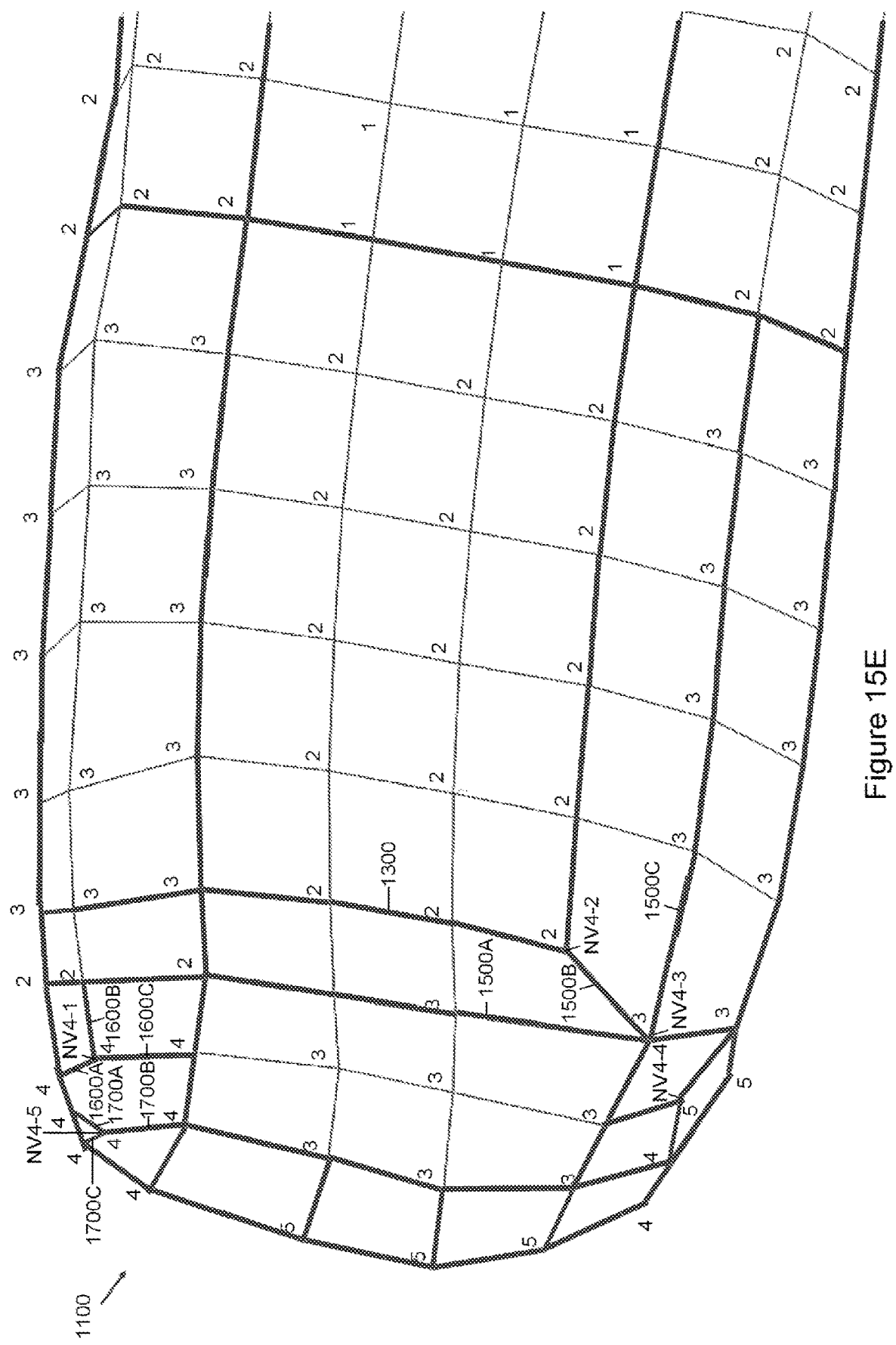

FIG. 15E illustrates data 1100 having additional boundary 1500C which further extends from non-valence 4 vertex NV4-3. Because no additional boundaries can be further extended, and 910 of method 1200 of FIG. 12 concludes.

Figure 16:
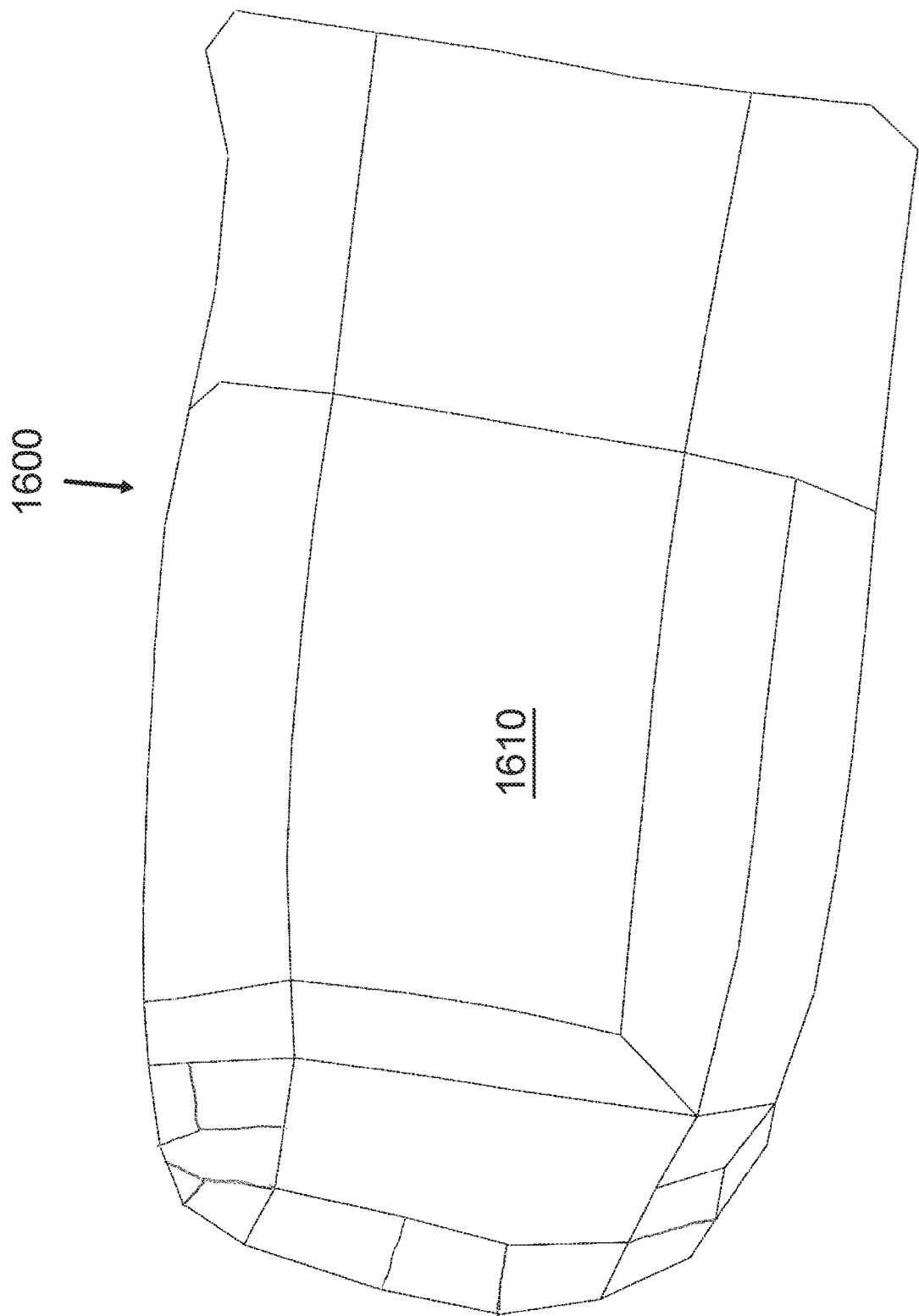

FIG. 16 illustrates the boundaries 1600 generated for the portion 1100 (illustrated in FIG. 11) of polygonal data 300 (illustrated in FIG. 3) with method 1200 of FIG. 12, where the boundaries 1600 define the bounded areas of 140 of method 100 of FIG. 1. FIG. 16 also indicates a particular bounded area 1610, which is referenced below.

In the following discussion, the computer system configured to perform or to be used to perform the method of FIG. 1 processes each of the bounded areas of polygonal data 300 according to 150, 160, 170, 180, and 190 of the method of FIG. 1. In some embodiments, parallel processing techniques, as understood by those of skill in the art, maybe used to process each of the bounded areas according to 150, 160, 170, 180, and 190 in parallel. Each of the bounded areas of polygonal data 300 are processed according to 150, 160, 170, 180, and 190 to generate a continuous surface.

At 150 of the method of FIG. 1, the computer system configured to perform or to be used to perform the method of FIG. 1 adds a series of vertices to the bounded area being processed. The locations of added vertices correspond with the locations of the most adjacent or nearest vertices of the bounded areas which are adjacent to the bounded area being processed.

Figure 17:
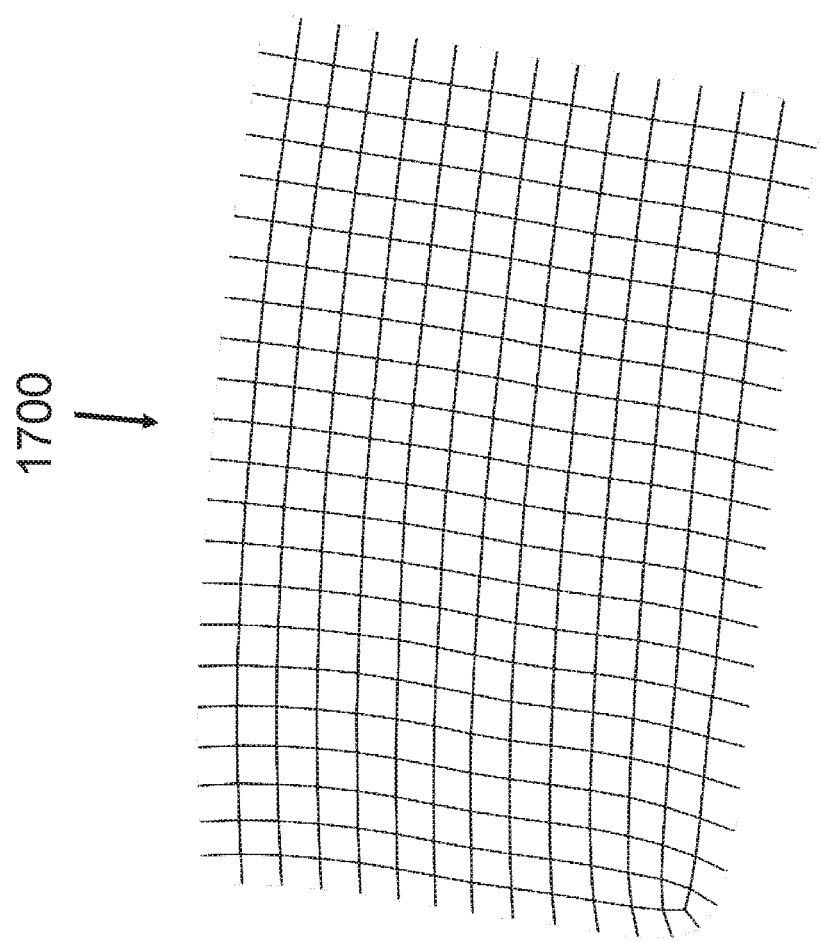
FIG. 17 illustrates subdivided data which includes subdivided data corresponding to bounded area 1610 illustrated in FIG. 16 and additionally includes subdivided data of the bounded areas which are adjacent to bounded area 1600.

FIG. 17 illustrates subdivided data 1700 which includes subdivided data corresponding to bounded area 1610 illustrated in FIG. 16 and additionally includes subdivided data of the bounded areas which are adjacent to bounded area 1600.

In this embodiment, the locations of vertices around the perimeter of subdivided data 1700 outside of the subdivided data corresponding to bounded area 1610, correspond with the locations of the most adjacent vertices of subdivided data from the bounded areas which are adjacent to bounded area 1610. In alternative embodiments, the locations of vertices 2010 are determined based on other vertices from the bounded areas which are adjacent to bounded area 1610.

For example, in some embodiments, the locations of vertices outside of the subdivided data corresponding to bounded area 1610 correspond with the locations of the $1^{st}$ and $2^{nd}$; the $1^{st}$, $2^{nd}$ and $3^{rd}$; or the $1^{st}$ through another number of most adjacent vertices from the bounded areas which are adjacent to bounded area 1610. Accordingly, in some embodiments, bounded area 1700 includes the subdivided polygonal data of bounded area 1610, and additionally extends a number of vertices into the subdivided polygonal data from bounded areas which are adjacent to bounded area 1610.

At 160 of the method of FIG. 1, the computer system configured to perform or to be used to perform the method of FIG. 1 creates a surface based on the polygonal data 1700 of the extended bounded area formed at 150 of the method of FIG. 1.

The polygonal data 1700 may be used by a surface generation technique to define a continuous surface.

Figure 18:
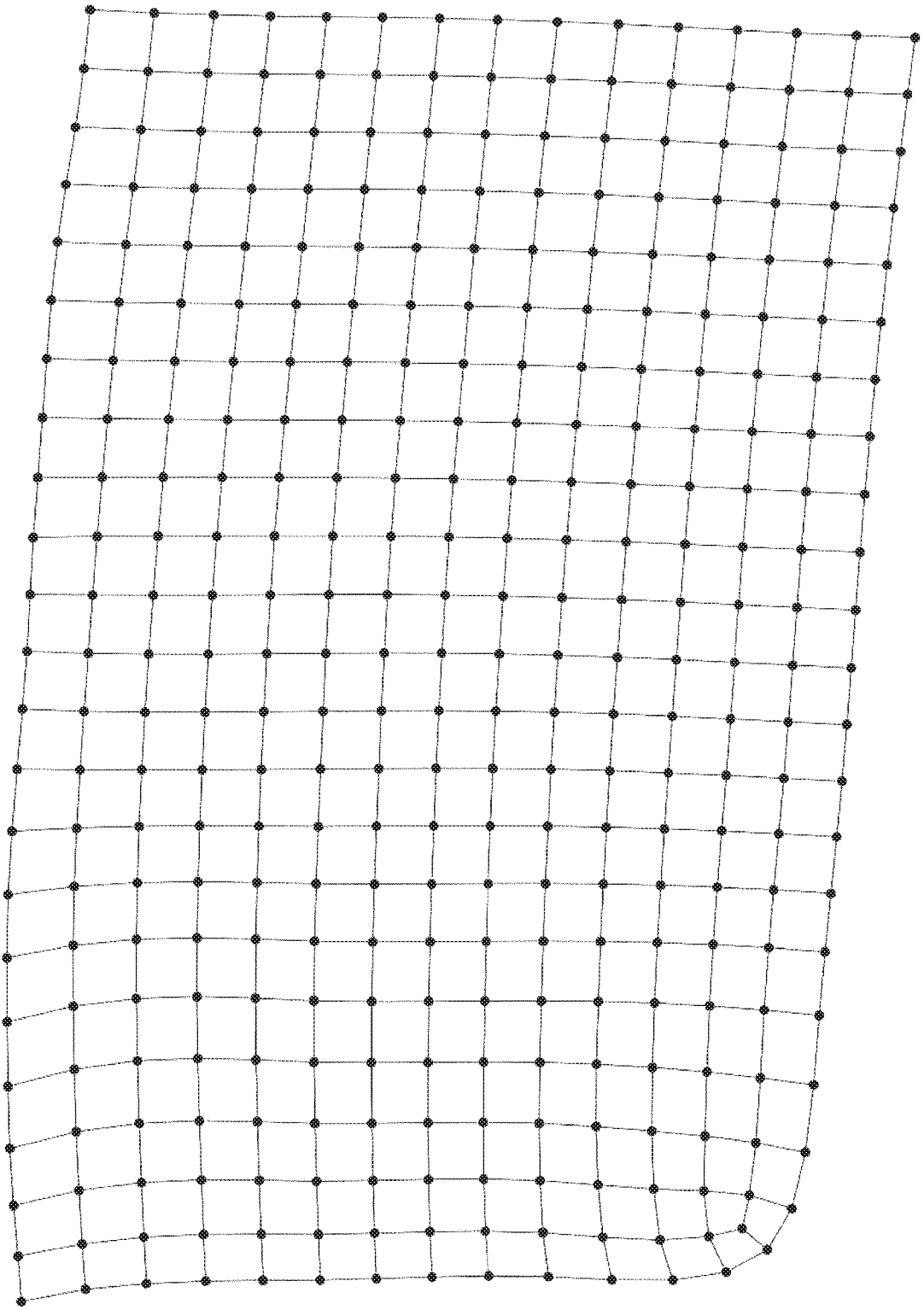
FIG. 18 illustrates a representation of the surface generated at 160.

FIG. 18 illustrates a representation of the surface generated at 160. The surface is a continuous surface generated from the polygonal data 1700 illustrated in FIG. 17. Some techniques for generating the continuous surface include variational surfacing and/or least squares fitting. Other surface generation techniques may additionally or alternatively be used, such as another unordered data fitting technique. In some embodiments, the generated surface is a NURBS surface. The surface may be another type of surface. The generated surface may be G2 continuous. In some embodiments, the surface is not G2 continuous.

The surface generated at 160 and illustrated in FIG. 18 is unclamped. At 170 of the method of FIG. 1, the computer system configured to perform or to be used to perform the method of FIG. 1 clamps the surface generated at 160 of the method of FIG. 1. Clamping techniques, as understood by those of skill in the art, may be used. In alternative embodiments, the surface generated at 160 of the method is not clamped.

In some embodiments, the surface generated at 160 is clamped by causing the surface to include the polygonal data along the extended bounded area formed at 150 of the method. In alternative embodiments, the surface is clamped by causing the surface generated at 160 to include the polygonal data along the outer boundary of the bounded area being processed.

In some embodiments, the surface is clamped by causing the surface generated at 160 to include the polygonal data offset by a number of vertices from the extended bounded area formed at 150. In such embodiments, the number of vertices may be equal to twice the number of most adjacent vertices from the bounded areas adjacent to the bounded area being processed used for locations of the added vertices.

In some embodiments, the surface generated at 160 is clamped by causing the surface to include the polygonal data:

along the extended bounded area formed at 150 of the method;

the polygonal data offset by a number of vertices from the extended bounded area formed at 150, where the number of vertices is equal to twice the number of most adjacent vertices from the bounded areas adjacent to the bounded area being processed used for locations of the added vertices; and the polygonal data along the outer boundary of the bounded area being processed.

In some embodiments, the surface generated at 160 is clamped by causing the surface to include the polygonal data:

along the extended bounded area formed at 150 of the method;

the polygonal data offset by a number of vertices from the extended bounded area formed at 150, where the number of vertices is equal to twice the number of most adjacent vertices from the bounded areas adjacent to the bounded area being processed used for locations of the added vertices; and the polygonal data between along the extended bounded area formed at 150 and the polygonal data offset by a number of vertices from the extended bounded area formed at 150.

Figure 19:
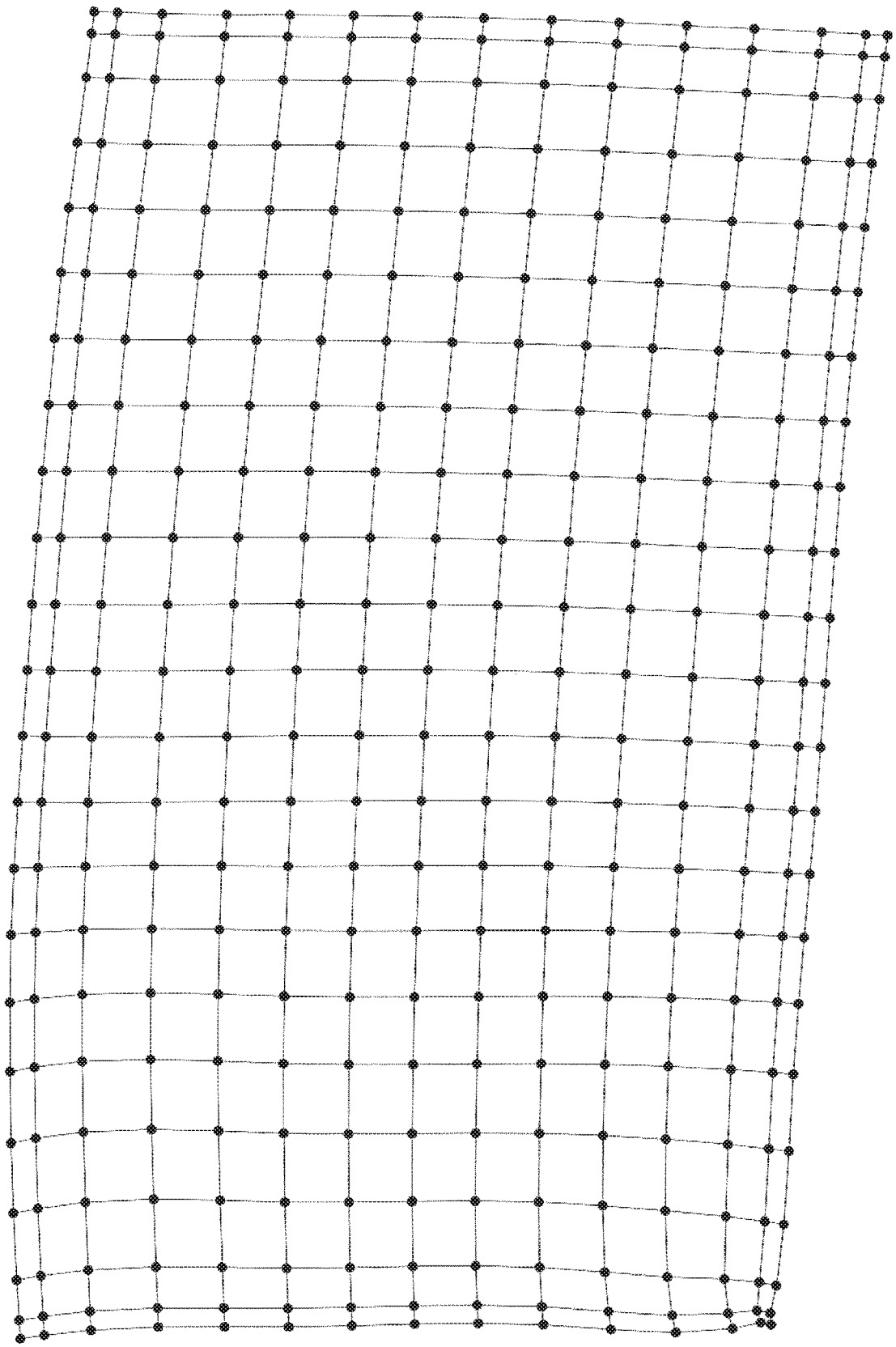
FIG. 19 illustrates a representation of the clamped surface.

FIG. 19 illustrates a representation of the clamped surface.

At 180 of the method of FIG. 1, the computer system configured to perform or to be used to perform the method of FIG. 1 changes the position of vertices at certain corners of the bounded areas being processed to, for example, improve smoothness in the regions including the corner vertices. In alternative embodiments, the positions of the corner vertices are not moved. The corner vertices being moved, may, for example, include corner vertices corresponding with corners associated with non-valence 4 vertices.

In some embodiments, to move the corner vertices, continuous surfaces are generated using vertices which are near the corner vertices whose continuity is to be improved. For example, all and/or only the vertices adjacent to a corner vertex can be used to generate a G2 continuous surfaces. In some embodiments, the corner vertex itself is not used in the continuous surface generation. In some embodiments, they are. In some embodiments, vertices used to generate the continuous surfaces include vertices within 2, 3, 4, 5, or about 10 vertices of the corner vertex being moved. In some embodiments a group of vertices which substantially surrounds the corner vertex are included. In some embodiments, vertices used to generate the continuous surfaces are limited to vertices within 2, 3, 4, 5, or about 10 vertices of the corner vertex being moved. In some embodiments, vertices used to generate the continuous surfaces include a predetermined portion of the vertices of the polygonal data. For example, vertices used to generate the continuous surfaces may include about 0.001%, about 0.01%, about 0.1%, or about 1% of vertices in the polygonal data nearest the corner vertex being moved. In some embodiments, vertices used to generate the continuous surfaces are limited to about 0.001%, about 0.01%, about 0.1%, or about 1% of vertices in the polygonal data nearest the corner vertex being moved.

In some embodiments, the continuous surface used for moving each corner vertex is the limit surface of the polygonal data model. For example, to acquire the limit surface, prior to the corner vertices being moved, the limit surface of the polygonal data model is generated based on the data of the polygonal data model.

Some techniques for generating continuous surfaces include variational surfacing and/or least squares fitting. Other surface generation techniques may additionally or alternatively be used, such as other ordered data fitting techniques. In some embodiments, the generated surface is a NURBS surface. Alternatively, the generated surface may, for example, be another type of surface, such as a Bezier surface, a Coons surface, a Gregory Patch, etc.) The generated surface may be G2 internally continuous. In some embodiments, the surface is not G2 internally continuous. Internal surface continuity is generally the continuity of a surface inside of the surface boundary.

Once the continuous surfaces are generated, each corner vertex is projected onto the continuous surface at a projection point where the surface is normal to the position of the corner vertex. The projection point is then used to modify the corresponding corner vertex. For example, the corner vertex may be replaced with data representing the position of the projection point. Data representing the position of the projection point may be stored in data representing the polygonal data, or data representing the position of the projection point may be stored for later use in calculating the data representing the continuous surface to be generated.

Figure 20:
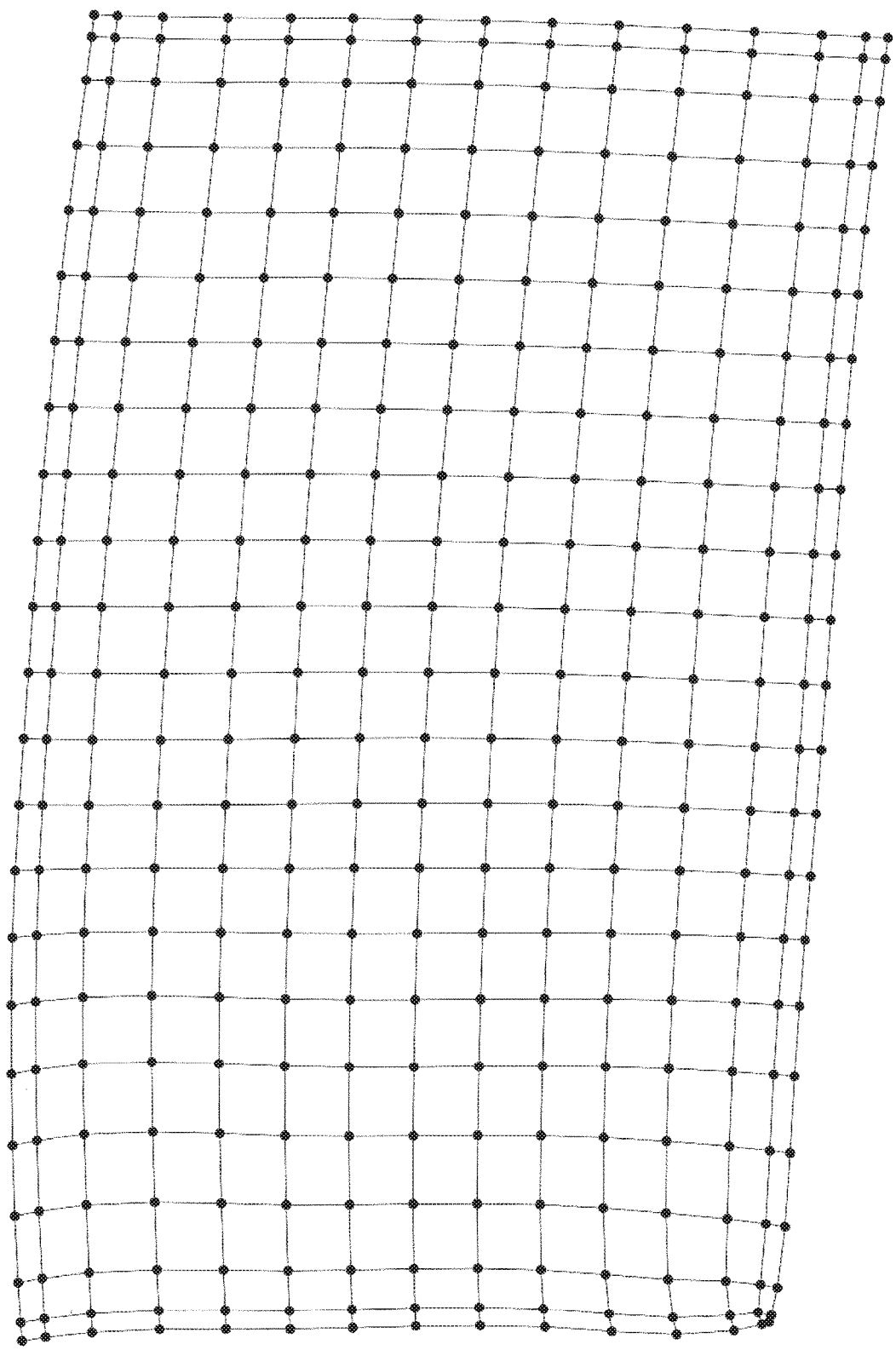
FIG. 20 illustrates a representation of the surface having its corner vertices moved.

FIG. 20 illustrates a representation of the surface having its corner vertices moved.

At 190 of the method of FIG. 1, the computer system configured to perform or to be used to perform the method of FIG. 1 removes some of the knots from the surface. For example, if certain particular knots are removed, and the surface is regenerated, the difference between the surface generated without the particular knots may be substantially identical to the surface generated with the particular knots. In order to reduce the number of vertices in the model data, such particular knots are removed from the model if the difference between the surface generated without the particular knots and the surface generated with the particular knots is less than a threshold. The difference and the threshold may, for example, have units of a distance, a curvature, a relative distance, a relative curvature, or another metric.

Figure 21:
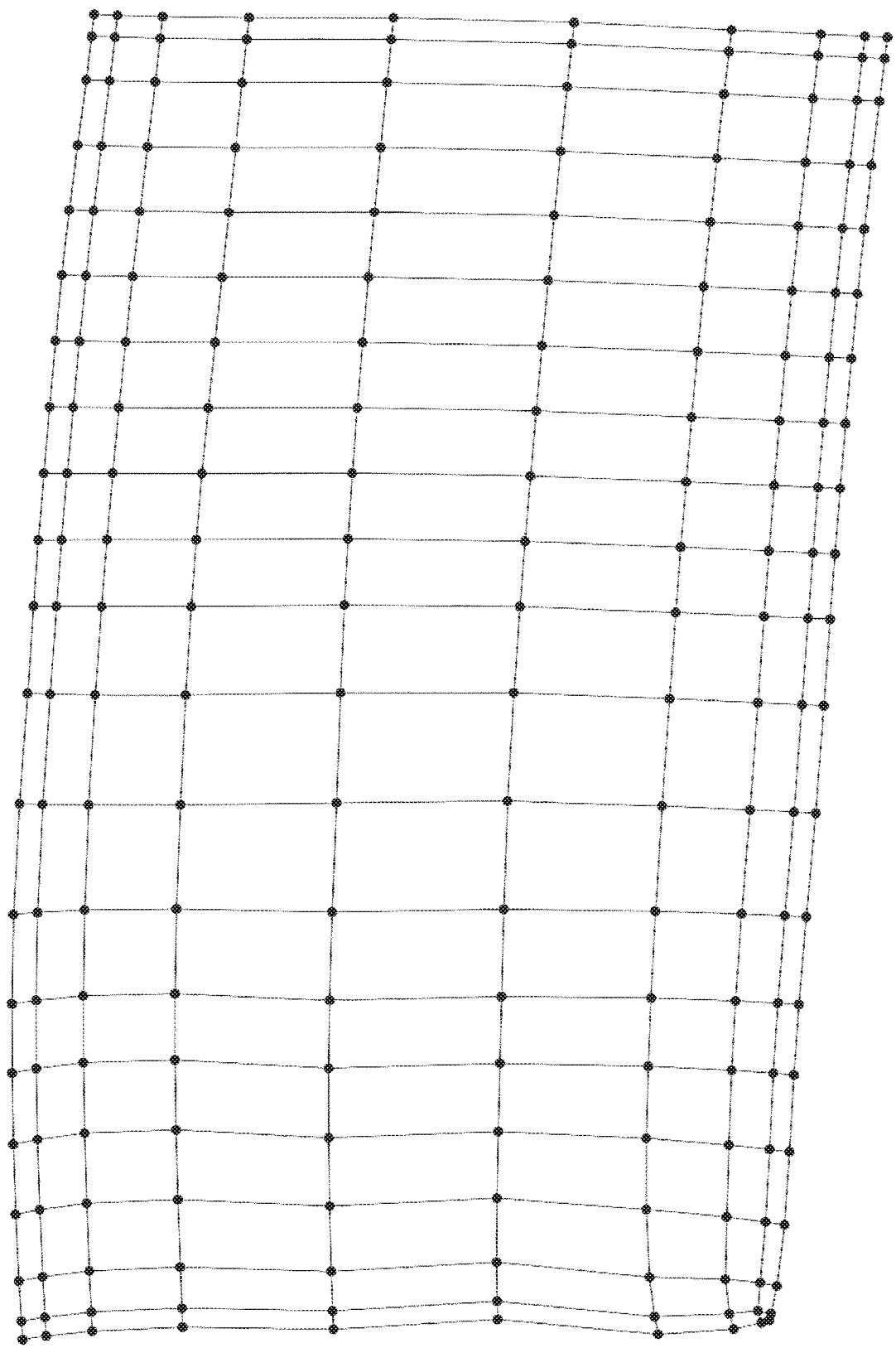
FIG. 21 illustrates a representation of the surface having certain knots removed.

FIG. 21 illustrates a representation of the surface having certain knots removed.

At 195 of the method of FIG. 1, the computer system configured to perform or to be used to perform the method of FIG. 1 assembles the surfaces generated for the bounded areas to generate surface data representing a surface corresponding with the polygonal data model received at 110 of the method 100 or with the limit surface of the polygonal data model received at 110 of the method 100. The surfaces generated for the bounded areas are assembled such that the position of each of the surfaces relative to the other surfaces corresponds with the position of the corresponding bounded area of the polygonal model relative to the other bounded areas of the polygonal model. In some embodiments, the portions of the collection of assembled surfaces corresponding to boundaries or transitions between the assembled surfaces is G2 continuous at all or substantially all points, and may be G1 continuous at points which are not G2 continuous.

Figure 22:
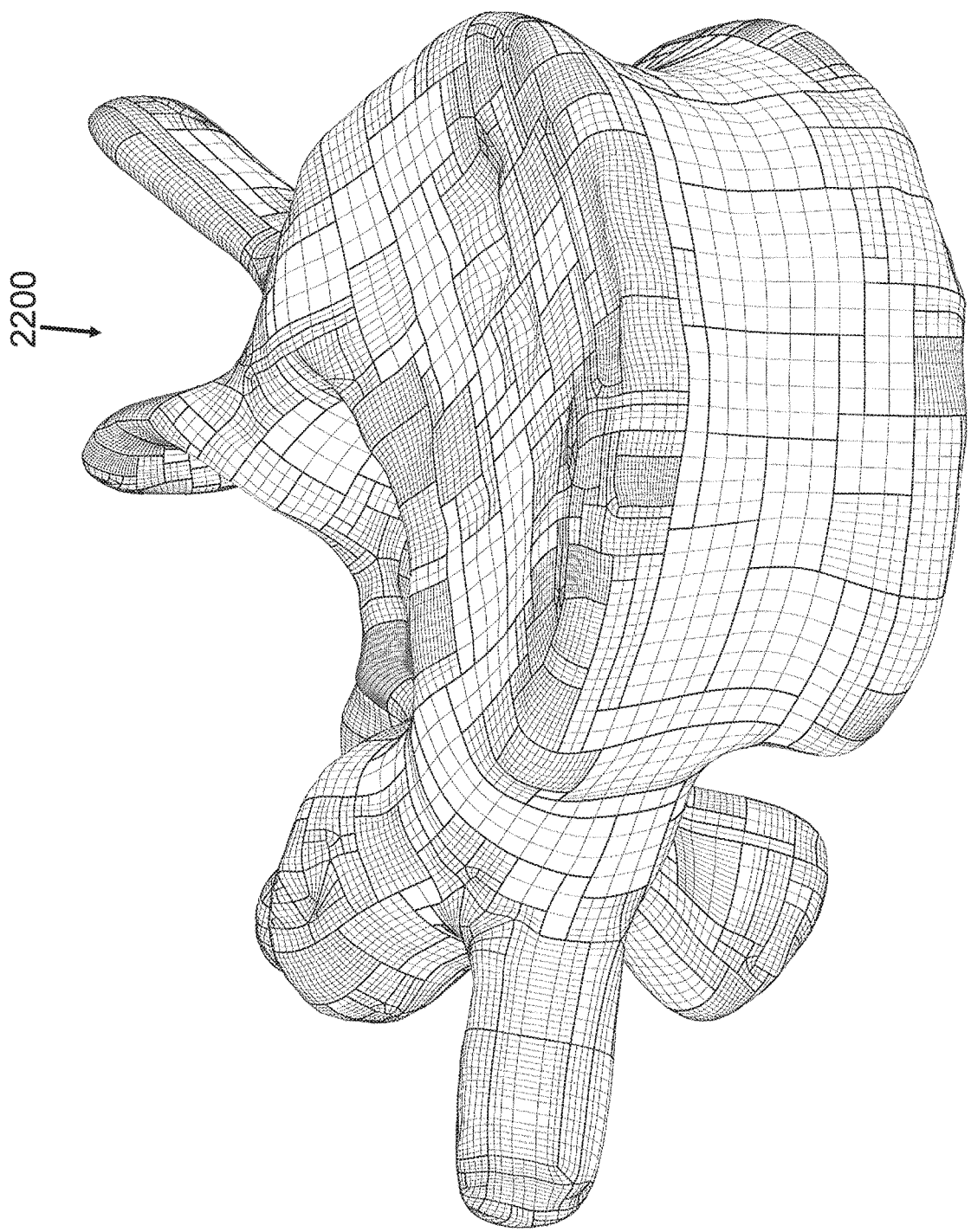
FIG. 22 illustrates a continuous surface formed from assembling the surfaces generated for the bounded areas.

FIG. 22 illustrates a continuous surface 2200 formed from assembling the surfaces generated for the bounded areas. The boundaries (illustrated with thick lines) correspond with the bounded areas created at 140 of the method of FIG. 1. In addition, the number of modification vectors or subdivision levels within each bounded area can be inferred by the density of the thinner lines within each bounded area.

The data representing the continuous surface 2200 corresponding with the assembled surface may be stored in a non-transitory computer readable medium, such as a memory storage device. The data may be used to generate an electronic or printed image of the continuous surface. The data may also be used to generate a physical representation or instructions for generating a physical representation of the continuous surface.

FIG. 23 shows a configuration for a computer system 2310 constructed in accordance with the present disclosure to perform the operations disclosed herein. The computer system 2310 can comprise a system such as a personal computer or server computer or the like. The computer system 2310 may include a network communication interface 2312 that permits communications with a network 2302. The network interface can comprise a network interface card (NIC). The computer system 2310 can execute instructions to provide a computer system which performs various aspects and principles of the methods and features described herein. For example, each of the components 2, 4, 6, 8 in FIG. 1 may be implemented by one or more of the computer systems 2310.

The computer system 2310 includes a central processor unit 2316 (CPU) and a program product reader 2318 for receiving a program product media and reading program instructions recorded thereon, where the instructions, when executed by the computer cause the computer to perform various aspects and principles of the methods and features described herein. The computer system also includes associated memory 2320 and input/output facilities 2322, such as a display for output and a keyboard and/or mouse for input. The processor 2316 of the computer system 2310 can receive program instructions into the program memory of the processor. The program instructions can be received directly, such as by flashing EEPROM of the processor, or can be received through the network interface 2312, such as by download from a connected device or over a WAN or LAN network communication. If desired, the program instructions can be stored on a computer program product 2314 that is read by the computer system 2310 so that the program instructions can thereafter executed. That is, the program product 2314 is for use in a system such as the computer system 2310, wherein the program product comprises a tangible, non-transitory recordable media containing a program of computer-readable instructions that are executable by the device processor 2304 to perform the operations described herein. The program product 2314 can comprise, for example, optical program media such as CD or DVD data discs, or flash memory drives, or external memory stores, or floppy magnetic disks, and the like.

The various aspects, processes, actions discussed herein may be performed sequentially or in parallel. For example, a system capable of parallel processing may divide certain procedures among the available processing devices.

While various aspects, processes, actions, and systems have been described as being included in the embodiments discussed, the various aspects, processes, actions, and systems can be practiced with certain modifications. For example, the sequential order of the various aspects, processes, and actions may be modified. In addition, certain aspects, processes, and actions may be omitted, and other aspects, processes, and actions may be added.

Though the present invention is disclosed by way of specific embodiments as described above, those embodiments are not intended to limit the present invention. Based on the methods and the technical aspects disclosed above, variations and changes may be made to the presented embodiments by those skilled in the art without departing from the spirit and the scope of the present invention.

What is claimed is:

1. A method of producing surface data representing a continuous surface based on electronic polygonal data, the method comprising:
    accessing the polygonal data with a computer, the polygonal data defining a mesh of polygonal data points and comprising a plurality of vertices, and wherein the polygonal data describes an object;
    generating a plurality of bounded areas based on the vertices of the polygonal data, each bounded area defined by a set of boundaries, wherein a first plurality of vertices of the polygonal data are inside a first bounded area, and wherein a second plurality of vertices of the polygonal data are inside a second bounded area, wherein the first and second pluralities of vertices of the polygonal data are mutually exclusive, wherein each of the first plurality of vertices is associated with a first quantity of subdivisions, wherein each of the second plurality of vertices is associated with a second quantity of subdivisions, and wherein the first and second quantities are different;
    expanding at least one of the first and second bounded areas wherein, because of the expansion, a plurality of vertices coincident with a boundary of the second bounded area are inside the first bounded area and a plurality of vertices coincident with a boundary of the first bounded area are inside the second bounded area;
    generating a surface for each of the expanded bounded areas based on the vertices of the expanded bounded areas, wherein one or more adjacent pairs of the generated surfaces overlap;
    generating the surface data based at least in part on the surfaces; and
    storing the surface data in a computer readable data storage.

2. The method of claim 1, further comprising, prior to accessing the polygonal data, generating the polygonal data from data generated by scanning the object.

3. The method of claim 1, further comprising, prior to accessing the polygonal data, generating the polygonal data through a subdivision process.

4. The method of claim 1, wherein each of the vertices is associated with a number of subdivision modification vectors, and wherein, prior to the expansion, the boundaries of the first bounded area are determined based on each of the vertices inside the first bounded being associated with a first number of subdivision modification vectors, and the boundaries of the second bounded area are determined based on each of the vertices inside the second bounded area being associated with a second number of subdivision modification vectors, and wherein the first and second numbers of subdivision modification vectors are different.

5. The method of claim 1, wherein each of the vertices has a valence corresponding with the number of polygons partially defined thereby, and wherein, prior to the expansion, one or more of the bounded areas have boundaries determined based on vertices having a valence other than four.

6. The method of claim 1, wherein expanding the bounded areas comprises adding a plurality of vertices of the polygonal data outside at least a portion of a perimeter of each of the bounded areas.

7. The method of claim 6, wherein the locations of the added vertices correspond with locations of vertices of adjacent bounded areas.

8. The method of claim 7, wherein the locations of the added vertices correspond with locations of the vertices of the adjacent bounded areas which are the most and the second most adjacent to the vertices of the bounded area being expanded.

9. The method of claim 1, further comprising moving a plurality of corner vertices to a limit surface of the polygonal data.

10. The method of claim 1, further comprising assembling the generated surfaces to define the surface data.

11. The method of claim 1, further comprising removing one or more knots of the surface data.

12. The method of claim 1, wherein the surface data is G2 continuous at all or substantially all points.

13. A method of producing surface data from electronic polygonal data, the method comprising:
    accessing the polygonal data with a computer, the polygonal data defining a mesh of polygonal data points and comprising a plurality of vertices, and wherein the polygonal data describes an object;
    generating a plurality of bounded areas based on the vertices of the polygonal data, wherein a plurality of vertices of the polygonal data are inside each of the bounded areas, wherein a plurality of vertices of the polygonal data are inside a plurality of bounded areas, wherein a first plurality of vertices of the polygonal data are inside a first bounded area, and wherein a second plurality of vertices of the polygonal data are inside a second bounded area, wherein each of the first plurality of vertices is associated with a first quantity of subdivisions, wherein each of the second plurality of vertices is associated with a second quantity of subdivisions and wherein the first and second quantities are different;
    generating a surface for each of the bounded areas based on the bounded areas, wherein one or more adjacent pairs of the generated surfaces overlap;
    assembling the generated surfaces to generate the surface data; and
    storing the surface data in a computer readable data storage.

14. The method of claim 13, further comprising, prior to accessing the polygonal data, generating the polygonal data from data generated by scanning the object.

15. The method of claim 13, further comprising, prior to accessing the polygonal data, generating the polygonal data through a subdivision process.

16. The method of claim 13, wherein each of the vertices is associated with a number of subdivision modification vectors, and wherein, prior to the expansion, the boundaries of the first bounded area are determined based on each of the vertices inside the first bounded being associated with a first number of subdivision modification vectors, and the boundaries of the second bounded area are determined based on each of the vertices inside the second bounded area being associated with a second number of subdivision modification vectors, and wherein the first and second numbers of subdivision modification vectors are different.

17. The method of claim 13, wherein each of the vertices has a valence corresponding with the number of polygons defined thereby, and wherein, prior to the expansion, the bounded areas have boundaries determined based on vertices having a valence other than four.

18. The method of claim 13, further comprising moving a plurality of corner vertices to a limit surface of the polygonal data.

19. The method of claim 13, wherein the assembled surfaces define a surface corresponding with the object.

20. The method of claim 13, further comprising removing one or more knots of the surface data.

\* \* \* \* \*